(12) United States Patent
Isojima et al.

(10) Patent No.: US 12,051,809 B2
(45) Date of Patent: Jul. 30, 2024

(54) ELECTRODE COMPOSITION, ELECTRODE SHEET FOR ALL-SOLID STATE SECONDARY BATTERY, ALL-SOLID STATE SECONDARY BATTERY, AND RESPECTIVE METHODS OF MANUFACTURING ELECTRODE COMPOSITION, ELECTRODE SHEET FOR ALL-SOLID STATE SECONDARY BATTERY, AND ALL-SOLID STATE SECONDARY BATTERY

(71) Applicant: FUJIFILM Corporation, Tokyo (JP)

(72) Inventors: Hiroshi Isojima, Kanagawa (JP); Shin Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 655 days.

(21) Appl. No.: 17/228,714

(22) Filed: Apr. 13, 2021

(65) Prior Publication Data
US 2021/0234172 A1    Jul. 29, 2021

Related U.S. Application Data

(63) Continuation of application No. PCT/JP2019/040103, filed on Oct. 10, 2019.

(30) Foreign Application Priority Data

Oct. 15, 2018 (JP) .................. 2018-194510
Feb. 7, 2019 (JP) .................. 2019-021099

(51) Int. Cl.
*H01M 4/62* (2006.01)
*H01M 4/02* (2006.01)
(Continued)

(52) U.S. Cl.
CPC .......... *H01M 4/622* (2013.01); *H01M 4/043* (2013.01); *H01M 4/366* (2013.01); *H01M 4/386* (2013.01);
(Continued)

(58) Field of Classification Search
CPC ...... H01M 4/622; H01M 4/043; H01M 4/366; H01M 4/386; H01M 10/0525; H01M 10/058
See application file for complete search history.

(56) References Cited

U.S. PATENT DOCUMENTS

2012/0156571 A1   6/2012  Kawamoto et al.
2018/0090787 A1   3/2018  Makino et al.
(Continued)

FOREIGN PATENT DOCUMENTS

EP     3866245       8/2021
JP     2010033876    2/2010
(Continued)

OTHER PUBLICATIONS

"Office Action of Korea Counterpart Application", issued on Mar. 20, 2023, with English translation thereof, pp. 1-13.
(Continued)

*Primary Examiner* — Karie O'Neill Apicella
(74) *Attorney, Agent, or Firm* — JCIPRNET

(57) ABSTRACT

Provided are an electrode composition, an electrode sheet for an all-solid state secondary battery and an all-solid state secondary battery that are formed of the electrode composition, and respective methods of manufacturing the electrode composition, the electrode sheet for an all-solid state secondary battery, and the all-solid state secondary battery. The electrode composition includes: an inorganic solid electrolyte; an active material; and a distributing component that binds to the inorganic solid electrolyte and the active material, in which one kind of the distributing component is a binder, a polymer forming the binder includes a repeating unit having an amino group, a sulfanyl group, a hydroxy group, a carboxy group, or an anone group, and a distribution rate of the distributing component to the inorganic solid
(Continued)

electrolyte in an electrode active material layer formed of the electrode composition exceeds 60%.

16 Claims, 1 Drawing Sheet

(51) Int. Cl.
    *H01M 4/04*         (2006.01)
    *H01M 4/36*         (2006.01)
    *H01M 4/38*         (2006.01)
    *H01M 10/0525*     (2010.01)
    *H01M 10/058*      (2010.01)

(52) U.S. Cl.
    CPC ..... *H01M 10/0525* (2013.01); *H01M 10/058* (2013.01); *H01M 2004/027* (2013.01); *H01M 2300/0068* (2013.01)

(56) References Cited

U.S. PATENT DOCUMENTS

2018/0277892 A1    9/2018    Mimura et al.
2019/0372160 A1*  12/2019   Makino ................. H01M 4/139

FOREIGN PATENT DOCUMENTS

| | | |
|---|---|---|
| JP | 5375975 | 12/2013 |
| JP | 2016139511 | 8/2016 |
| JP | 2018088306 | 6/2018 |
| WO | 2016136090 | 9/2016 |
| WO | 2016194705 | 12/2016 |
| WO | 2017018456 | 2/2017 |
| WO | 2017099247 | 6/2017 |
| WO | 2018151161 | 8/2018 |

OTHER PUBLICATIONS

"Search Report of Europe Counterpart Application", issued on Jan. 5, 2022, pp. 1-10.

Office Action of Japan Counterpart Application, with English translation thereof, issued on Jan. 11, 2022, pp. 1-6.

"International Search Report (Form PCT/ISA/210) of PCT/JP2019/040103," mailed on Nov. 26, 2019, with English translation thereof, pp. 1-3.

"Written Opinion of the International Searching Authority (Form PCT/ISA/237) of PCT/JP2019/040103," mailed on Nov. 26, 2019, with English translation thereof, pp. 1-6.

* cited by examiner

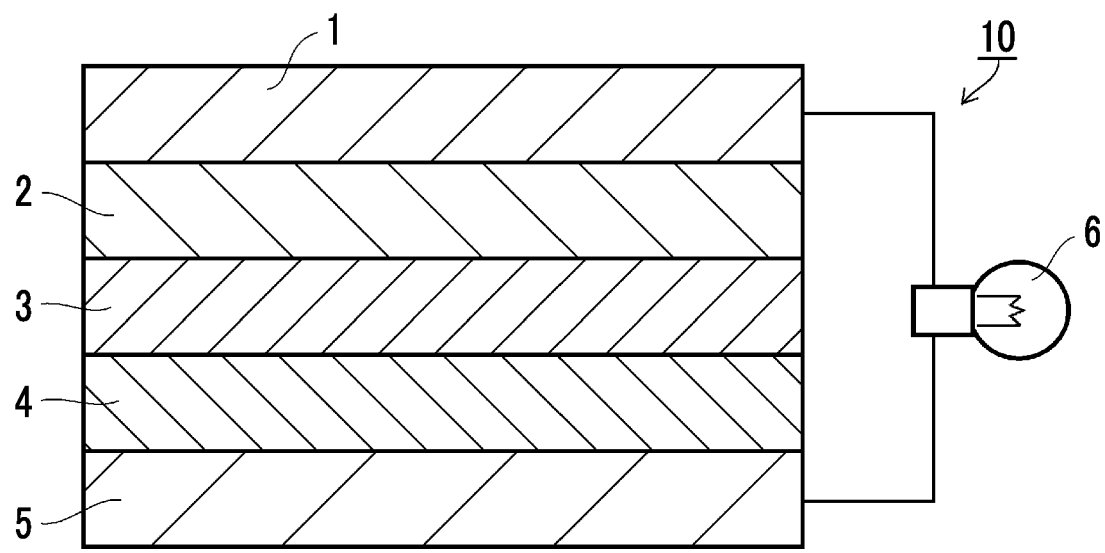

ELECTRODE COMPOSITION, ELECTRODE SHEET FOR ALL-SOLID STATE SECONDARY BATTERY, ALL-SOLID STATE SECONDARY BATTERY, AND RESPECTIVE METHODS OF MANUFACTURING ELECTRODE COMPOSITION, ELECTRODE SHEET FOR ALL-SOLID STATE SECONDARY BATTERY, AND ALL-SOLID STATE SECONDARY BATTERY

CROSS-REFERENCE TO RELATED APPLICATIONS

This application is a Continuation of PCT International Application No. PCT/JP2019/040103 filed on Oct. 10, 2019, which claims priorities under 35 U.S.C. § 119 (a) to Japanese Patent Application No. 2018-194510 filed in Japan on Oct. 15, 2018 and Japanese Patent Application No. 2019-021099 filed in Japan on Feb. 7, 2019. Each of the above applications is hereby expressly incorporated by reference, in its entirety, into the present application.

BACKGROUND OF THE INVENTION

1. Field of the Invention

The present invention relates to an electrode composition, an electrode sheet for an all-solid state secondary battery, an all-solid state secondary battery, and respective methods of manufacturing the electrode composition, the electrode sheet for an all-solid state secondary battery, and the all-solid state secondary battery.

2. Description of the Related Art

A lithium ion secondary battery is a storage battery including a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short-circuit and ignition may be caused in batteries due to overcharging or overdischarging, and there is a demand for additional improvement in safety and reliability.

Under these circumstances, all-solid state secondary batteries in which an inorganic solid electrolyte is used instead of the organic electrolytic solution are attracting attention. In an all-solid state secondary battery, a negative electrode, an electrolyte, and a positive electrode are all solid, and safety or reliability of batteries including an organic electrolytic solution can be significantly improved.

In the all-solid state secondary battery, as a material for forming a constituent layer such as a negative electrode active material layer, a solid electrolyte layer, or a positive electrode active material layer, a material including an inorganic solid electrolyte, an active material, and a polymer is disclosed.

For example, JP5375975B describes an electrode mixture including an inorganic solid electrolyte and an electrode active material, in which a content of a polymer compound dispersed in the inorganic solid electrolyte is a specific content.

SUMMARY OF THE INVENTION

In order to improve the productivity and performance of an all-solid state secondary battery, the hardness of an electrode active material layer in an electrode sheet for an all-solid state secondary battery is required to be improved. However, according to an investigation by the present inventors, it was found that in an electrode sheet for an all-solid state secondary battery formed of the electrode mixture described in JP5375975B, the film hardness of an electrode active material layer may be low. Further, it was found that, in an all-solid state secondary battery including the electrode sheet for an all-solid state secondary battery, cycle characteristics are insufficient.

An object of the present invention is to provide an electrode composition. By using this electrode composition as a material for forming an electrode active material layer, an electrode sheet that includes an electrode active material layer having excellent film hardness and an all-solid state secondary battery having excellent cycle characteristics can be realized. In addition, another object of the present invention is to provide an electrode sheet for an all-solid state secondary battery and an all-solid state secondary battery that include the electrode active material layer formed of the electrode composition. In addition, still another object of the present invention is to provide respective methods of manufacturing the electrode composition, the electrode sheet for an all-solid state secondary battery, and the all-solid state secondary battery.

The present inventors repeatedly conducted a thorough investigation and found that, in an electrode active material layer formed of an electrode composition prepared using a combination of an inorganic solid electrolyte, an active material, and a binder including a polymer that includes a repeating unit having a specific functional group as a component, in a case where a distribution rate of a distributing component including the binder to the inorganic solid electrolyte exceeds a specific value, the electrode active material layer has excellent film hardness and an all-solid state secondary battery into which an electrode sheet including the electrode active material layer is incorporated has excellent cycle characteristics. The present invention has been completed based on the above findings as a result of repeated investigation.

That is, the above-described objects have been achieved by the following means.

<1> An electrode composition comprising:
an inorganic solid electrolyte;
an active material; and
a distributing component that binds to the inorganic solid electrolyte and the active material,
in which one kind of the distributing component is a binder,
a polymer forming the binder includes a repeating unit having an amino group, a sulfanyl group, a hydroxy group, a carboxy group, or an anone group, and
a distribution rate of the distributing component to the inorganic solid electrolyte in an electrode active material layer formed of the electrode composition exceeds 60%.

<2> The electrode composition according to <1>,
wherein an adsorption rate A of the binder to the active material and an adsorption rate B of the binder to the inorganic solid electrolyte satisfy the following Expressions I) and II), $$\text{Adsorption Rate } B \geq 20\%, \text{ and} \qquad \text{Expression I)}$$

$$\text{Adsorption Rate } B > \text{Adsorption Rate } A. \qquad \text{Expression II)}$$

<3> The electrode composition according to <2>,
in which the adsorption rate A is 25% or lower.
<4> The electrode composition according to any one of <1> to <3>,
in which the binder is a particle binder.
<5> The electrode composition according to any one of <1> to <4>,
in which the polymer forming the binder is a polymer having an amide bond, a urea bond, or a urethane bond.
<6> The electrode composition according to any one of <1> to <5>,
in which the active material is a negative electrode active material having a silicon atom or a tin atom.
<7> The electrode composition according to <6>,
in which the negative electrode active material is a negative electrode active material having a silicon atom.
<8> The electrode composition according to any one of <1> to <7>,
in which a content of the binder is higher than 2 mass % and 20 mass % or lower with respect to all solid components in the electrode composition.
<9> The electrode composition according to any one of <1> to <8>,
in which a modulus of elasticity of a polymer forming the binder that is measured according to JIS K 7161 (2014) is 10 to 500 MPa.
<10> The electrode composition according to any one of <1> to <9>,
in which a tensile strain at break of a polymer forming the binder that is measured according to JIS K 7161 (2014) is 50% to 700%.
<11> An electrode sheet for an all-solid state secondary battery, the electrode sheet comprising:
an electrode active material layer including an inorganic solid electrolyte, an active material, and a distributing component that binds to the inorganic solid electrolyte and the active material,
in which one kind of the distributing component is a binder,
a polymer forming the binder includes a repeating unit having an amino group, a sulfanyl group, a hydroxy group, or an anone group, and
a distribution rate of the distributing component to the inorganic solid electrolyte in the electrode active material layer exceeds 60%.
<12> An all-solid state secondary battery comprising, in the following order:
a positive electrode active material layer;
a solid electrolyte layer; and
a negative electrode active material layer in this order,
in which at least one of the positive electrode active material layer or the negative electrode active material layer is formed of the electrode composition according to any one of <1> to <10>.
<13> A method of manufacturing the electrode composition according to any one of <1> to <10>, the method comprising:
a step of mixing an inorganic solid electrolyte and a binder with each other to obtain a mixture; and
a step of mixing the mixture and an active material with each other.
<14> A method of manufacturing an electrode sheet for an all-solid state secondary battery, the method comprising:
a step of applying the electrode composition obtained using the manufacturing method according to <13>.

<15> A method of manufacturing an all-solid state secondary battery, the method comprising:
a step of manufacturing an all-solid state secondary battery using the electrode sheet for an all-solid state secondary battery obtained using the manufacturing method according to <14>.

In the description of the present invention, "anone group" refers to a group derived from cyclohexanone. Examples of the anone group include a monovalent group obtained by removing one hydrogen atom from a carbon atom adjacent to a carbon atom bonded to an oxygen atom of cyclohexanone.

By using the electrode composition according to an aspect of the present invention as a material for forming an electrode active material layer, an electrode sheet that includes an electrode active material layer having excellent film hardness and an all-solid state secondary battery having excellent cycle characteristics can be realized. In addition, the present invention can provide an electrode sheet for an all-solid state secondary battery and an all-solid state secondary battery that include the electrode active material layer formed of the electrode composition. Further, the present invention can provide respective methods of manufacturing the electrode composition, the electrode sheet for an all-solid state secondary battery formed of the electrode composition, and the all-solid state secondary battery.

BRIEF DESCRIPTION OF THE DRAWINGS

FIG. 1 is a vertical cross-sectional view schematically showing an all-solid state secondary battery according to a preferred embodiment of the present invention.

DESCRIPTION OF THE PREFERRED EMBODIMENTS

In the present specification, numerical ranges represented by "to" include numerical values before and after "to" as lower limit values and upper limit values.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where desired effects are exhibited.

A substituent, a linking group, or the like (hereinafter, referred to as "substituent or the like") is not specified in the present specification regarding whether to be substituted or unsubstituted may have an appropriate substituent. Accordingly, even in a case where a YYY group is simply described in the present specification, this YYY group includes not only an aspect not having a substituent but also an aspect having a substituent. The same shall be applied to a compound which is not specified in the present specification regarding whether to be substituted or unsubstituted. Preferable examples of the substituent include a substituent Z described below.

In the present specification, in a case where a plurality of substituents or the like represented by a specific reference numeral are present or a plurality of substituents or the like are simultaneously or alternatively defined, the respective substituents or the like may be the same as or different from each other. In addition, unless specified otherwise, in a case where a plurality of substituents or the like are adjacent to each other, the substituents may be linked or fused to each other to form a ring.

[Electrode Composition]

An electrode composition according to an embodiment of the present invention comprises: an inorganic solid electrolyte; an active material; and a distributing component that binds to the inorganic solid electrolyte and the active material at a predetermined ratio. In an electrode active material layer formed of the electrode composition, a distribution rate of the distributing component to the inorganic solid electrolyte with respect to the total content of the inorganic solid electrolyte and the active material exceeds 60%. One kind of the distributing component is a binder. "Binding" described above includes not only physical binding but also electronic binding (electrons are transferred). Even in a case where an adsorption rate A described below is 0%, as long as the binder is distributed to the active material, it is understood that the binder binds to the active material.

In an electrode sheet for an all-solid state secondary battery including an electrode active material layer formed of the electrode composition according to the embodiment of the present invention, the film hardness of the electrode active material layer is excellent. In an all-solid state secondary battery including this electrode sheet for an all-solid state secondary battery, cycle characteristics are excellent. The reason for this is not clear but is presumed to be that, in a case where the distribution rate of the distributing component including the polymer that includes the repeating unit having the specific functional group exceeds 60%, an inorganic solid electrolyte-polymer network (this network may include a conductive auxiliary agent) is formed in the electrode active material layer. Due to the presence of the network, the film hardness of the electrode active material layer can be improved. In addition, in a case where the all-solid state secondary battery is charged and discharged, a volume change of the electrode active material layer itself caused by an increase or decrease in volume due to expansion and contraction of the active material can be reduced, and thus cycle characteristics of the all-solid state secondary battery can be improved.

It is preferable that the electrode composition according to the embodiment of the present invention includes a dispersion medium. In this case, an aspect where the inorganic solid electrolyte, the active material, the distributing component, and the dispersion medium are mixed is not particularly limited. It is preferable that the electrode composition according to the embodiment of the present invention is a slurry in which the inorganic solid electrolyte, the active material, and the distributing component are dispersed in the dispersion medium.

The electrode composition according to the embodiment of the present invention can be preferably used as a material for forming an active material layer of an electrode sheet for an all-solid state secondary battery or an all-solid state secondary battery.

The moisture content (also referred to as "water content") in the electrode composition according to the embodiment of the present invention is not particularly limited and is preferably 500 ppm or lower, more preferably 200 ppm or lower, still more preferably 100 ppm or lower, and still more preferably 50 ppm or lower by mass. In a case where the moisture content of the electrode composition is low, deterioration of the sulfide-based inorganic solid electrolyte can be suppressed. The moisture content refers to the amount of water (the mass ratio thereof to the electrode composition) in the electrode composition and specifically is a value measured by Karl Fischer titration after filtering the solid electrolyte composition through a membrane filter having a pore size of 0.02 μm.

Hereinafter, the components that are included in the electrode composition according to the embodiment of the present invention and components that may be included therein will be described.

<Inorganic Solid Electrolyte>

The electrode composition according to the embodiment of the present invention includes an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic matter as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has ion conductivity of a metal belonging to Group 1 or Group 2 in the periodic table and generally does not have electron conductivity. In a case where an all-solid state secondary battery according to the embodiment of the present invention is a lithium ion battery, the inorganic solid electrolyte preferably has ion conductivity of lithium ions.

The inorganic solid electrolyte can be appropriately selected from solid electrolyte materials that are typically used for an all-solid state secondary battery. Representative examples of the inorganic solid electrolyte include (i) a sulfide-based inorganic solid electrolyte and (ii) an oxide-based inorganic solid electrolyte. In the present invention, from the viewpoint that a more favorable interface can be formed between the active material and the inorganic solid electrolyte, a sulfide-based inorganic solid electrolyte is preferably used.

(i) Sulfide-Based Inorganic Solid Electrolyte

The sulfide-based inorganic solid electrolyte is preferably a compound that contains a sulfur atom, has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. The sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by Formula (A).

   Formula (A)

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the mixing amounts of raw material compounds to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M described above (for example, $SiS_2$, SnS, and $GeS_2$).

The ratio between $Li_2S$ and $P_2S_5$ in each of Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1\text{-}10^{-3}$ S/cm or more. The upper limit is not particularly limited but is realistically $1 \times 10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_3$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom, has ion conductivity of a metal belonging to Group 1 or Group 2 in the periodic table, and has electron-insulating properties.

The ion conductivity of the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit is not particularly limited but is realistically $1 \times 10^{-1}$ S/cm or less.

Specific examples of the compound include: $Li_{xa}La_{ya}TiO_3$ (xa satisfies $0.3 \leq xa \leq 0.7$ and ya satisfies $0.3 \leq ya \leq 0.7$) (LLT); $Li_{xb}La_{yb}Zr_{zb}M^{bb}_{mb}O_{nb}$ ($M^{bb}$ represents one or more elements selected from Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}_{zc}O_{nc}$ ($M^{cc}$ represents one or more elements selected from C, S, Al, Si, Ga, Ge, In, or Sn, xc satisfies $0 < xc \leq 5$, yc satisfies $0 < yc \leq 1$, zc satisfies $0 < zc \leq 1$, and nc satisfies $0 < nc \leq 6$); $Li_{xd}(Al,Ga)_{yd}(Ti,Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}_{xe}D^{ee}O$ (xe represents a number of 0 to 0.1, $M^{ee}$ represents a divalent metal atom, and $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 \leq zf \leq 10$); $Li_{xg}S_{yg}t_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$, $Li_2O$—$SiO_2$; $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_2$ having a natrium super ionic conductor (NASICON)-type crystal structure; $Li_{1+xh+yh}(Al,Ga)_{xh}(Ti,Ge)_{2-xh}Si_{yh}P_{3-yh}O_{12}$ (xh satisfies $0 \leq xh \leq 1$, and yh satisfies $0 \leq yh \leq 1$); and $Li_7La_3Zr_2O_{12}$ (LLZ) having a garnet-type crystal structure.

In addition, phosphorus compounds containing Li, P, and O are also desirable. Examples of the phosphorus compound include: lithium phosphate ($Li_3PO_4$); LiPON in which some of oxygen atoms in lithium phosphate are substituted with nitrogen atoms; and $LiPOD^1$ ($D^1$ preferably represents one or more elements selected from Ti, V, Cr, Mn, Fe, Co, Ni, Cu, Zr, Nb, Mo, Ru, Ag, Ta, W, Pt, or Au).

Further, for example, $LiA^1ON$ ($A^1$ represents one or more elements selected from Si, B, Ge, Al, C, or Ga) can be preferably used.

The inorganic solid electrolyte is preferably in the form of particles. In this case, the average particle size (volume average particle size) of the inorganic solid electrolyte is not particularly limited, but is preferably 0.01 μm or more and more preferably 0.1 μm or more. The upper limit is preferably 100 μm or less and more preferably 50 μm or less. "Volume average particle size" refers to a volume median size. The median size corresponds to a cumulative value of 50% in a case where a particle size distribution is represented by a cumulative distribution.

The average particle size is measured in the following order. The inorganic solid electrolyte particles are diluted using water (heptane in a case where the inorganic solid electrolyte is unstable in water) in a 20 mL sample bottle to prepare 1 mass % of a dispersion liquid. The diluted dispersion sample is irradiated with 1 kHz ultrasonic waves for 10 minutes and is then immediately used for testing. The volume average particle size is obtained by acquiring data 50 times using this dispersion liquid sample, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five samples are prepared and the average value thereof is adopted.

As the inorganic solid electrolyte, one kind may be used alone, or two or more kinds may be used in combination.

The total mass (mg) of the active material and the inorganic solid electrolyte per unit area ($cm^2$) of the electrode active material layer (weight per unit area) is not particularly limited. The total mass (mg) can be appropriately determined depending on the designed battery capacity and may be, for example, 1 to 100 mg/cm$^2$.

From the viewpoints of dispersibility, a reduction in interface resistance, and binding properties, the content of the inorganic solid electrolyte in the electrode composition is not particularly limited, and the total content of the inorganic solid electrolyte and the active material described below is preferably 50 mass % or higher, more preferably 70 mass % or higher, and still more preferably 90 mass % or higher with respect to 100 mass % of the solid content. From the same viewpoint, the upper limit is preferably 99.9 mass % or lower, more preferably 99.5 mass % or lower, still more preferably 99 mass % or lower, and still more preferably 95 mass % or lower.

In the present invention, the solid content (solid component) refers to components that does not disappear by volatilization and evaporation in a case where the electrode composition is dried at 150° C. for 6 hours in a nitrogen atmosphere at a pressure of 1 mmHg. Typically, the solid content refers to components other than a dispersion medium described below.

<Active Material>

The electrode composition according to the embodiment of the present invention includes an active material capable of intercalating and deintercalating ions of a metal belonging to Group 1 or Group 2 in the periodic table. Although described below, examples of the active material include a positive electrode active material and a negative electrode active material. As the positive electrode active material, a metal oxide is preferable (more preferably a transition metal oxide). As the negative electrode active material, a metal oxide or a metal such as Sn, Si, Al, or In capable of forming an alloy with lithium is preferable.

(Positive Electrode Active Material)

The positive electrode active material is preferably capable of reversibly intercalating or deintercalating or capable of intercalating and deintercalating lithium ions. The material is not particularly limited as long as it has the above-described characteristics and may be transition metal oxides, elements capable of being complexed with Li such as sulfur, or the like.

Among these, as the positive electrode active material, transition metal oxides are preferably used, and transition metal oxides having a transition metal element Ma (one or more elements selected from Co, Ni, Fe, Mn, Cu, and V) are more preferable. In addition, an element Me (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element M$^a$. It is more preferable that the transition metal oxide is synthesized by mixing the above components such that a molar ratio Li/M$^3$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include LiCoO$_2$ (lithium cobalt oxide [LCO]), LiNi$_2$O$_2$ (lithium nickel oxide) LiNi$_{0.85}$Co$_{0.10}$Al$_{0.05}$O$_2$ (lithium nickel cobalt aluminum oxide [NCA]), LiN$_{1/3}$Co$_{1/3}$Mn$_{1/3}$O$_2$ (lithium nickel manganese cobalt oxide [NMC]), and LiNi$_{0.5}$Mn$_{0.1}$O$_2$ (lithium manganese nickel oxide).

Specific examples of the transition metal oxides having a spinel-type structure (MB) include LiMn$_2$O$_4$(LMO), LiCoMnO$_4$, Li$_2$FeMn$_3$O$_8$, Li$_2$CuMn$_3$O$_8$, Li$_2$CrMn$_3$O$_8$, and Li$_2$NiMn$_3$O$_8$.

Examples of the lithium-containing transition metal phosphate compounds (MC) include olivine-type iron phosphate salts such as LiFePO$_4$ and Li$_3$Fe$_2$(PO$_4$)$_3$, iron pyrophosphates such as LiFeP$_2$O$_7$, and cobalt phosphates such as LiCoPO$_4$, and monoclinic nasicon type vanadium phosphate salt such as Li$_3$V$_2$(PO$_4$)$_3$ (lithium vanadium phosphate).

Examples of the lithium-containing transition metal halogenated phosphate compounds (MD) include iron fluorophosphates such as Li$_2$FePO$_4$F, manganese fluorophosphates such as Li$_2$MnPO$_4$F, and cobalt fluorophosphates such as Li$_2$CoPO$_4$F.

Examples of the lithium-containing transition metal silicate compounds (ME) include Li$_2$FeSiO$_4$, Li$_2$MnSiO$_4$, and Li$_2$CoSiO$_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (sphere-equivalent average particle size) of the positive electrode active material is not particularly limited. For example, the volume average particle size can be set to 0.1 to 50 µm. In order to allow the positive electrode active material to have a predetermined particle size, an ordinary pulverizer or classifier may be used. Positive electrode active materials obtained using a calcination method may be used after being washed with water, an acidic aqueous solution, an alkaline aqueous solution, or an organic solvent. The volume average particle size (sphere-equivalent average particle size) of positive electrode active material particles can be measured using a laser diffraction/scattering particle size distribution analyzer LA-920 (trade name, manufactured by Horiba Ltd.).

As the positive electrode active material, one kind may be used alone, or two or more kinds may be used in combination.

(Negative Electrode Active Material)

The negative electrode active material is preferably capable of reversibly intercalating or deintercalating or capable of intercalating and deintercalating lithium ions. The material is not particularly limited as long as it has the above-described characteristics, and examples thereof include carbonaceous materials, metal oxides such as tin oxide, silicon oxide, metal composite oxides, a lithium single body, lithium alloys such as a lithium aluminum alloy, metals capable of forming alloys with lithium such as Sn, Si, Al, and In and the like. Among these, a carbonaceous material or a metal composite oxide is preferably used from the viewpoint of reliability. In addition, the metal composite oxide is preferably capable of intercalating and deintercalating lithium. The materials are not particularly limited, but preferably include at least any one of titanium or lithium as components from the viewpoint of high current density charging-discharging characteristics.

The carbonaceous material which is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 2θ in case of being measured by an X-ray diffraction method using CuKα rays, and the oxide may have a crystalline diffraction line. The highest intensity in a crystalline diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystalline diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Ge, Pb, Sb, and Bi, and chalcogenides are particularly preferable. Specific examples of preferred amorphous oxides and chalcogenides include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, $Sb_2S_5$, and $SnSiS_3$.

The negative electrode active material preferably contains a titanium atom. More specifically, $Li_4Ti_5O_{12}$ (lithium titanium oxide [LTO]) is preferred since the volume fluctuation during the intercalation and deintercalation of lithium ions is small, and thus the high-speed charging-discharging characteristics are excellent, and the deterioration of electrodes is suppressed. Therefore, it becomes possible to improve the service lives of lithium ion secondary batteries.

In the present invention, as the negative electrode active material, a negative electrode active material having a silicon atom or a tin atom that has large expansion and contraction during charging and discharging and is capable of forming an alloy with lithium can be used, it is preferable that a negative electrode active material having a silicon atom that has a higher volume is used, and it is more preferable that a negative electrode active material in which the content of a silicon atom is 50 mol % or higher with respect to all the constituent atoms is used.

Generally, a silicon negative electrode or a tin negative electrode is capable of intercalating a larger number of Li ions than a carbon negative electrode (graphite, acetylene black, or the like). That is, the amount of Li ions intercalated per unit weight increases. Therefore, it is possible to increase the discharge capacity. As a result, there is an advantage that the battery run time can be extended.

Specific preferable examples of the negative electrode active material having a silicon atom or a tin atom include: Sn, Si, or SiOx (0<x≤1); an alloy (for example, $LaSi_2$ or $VSi_2$) or an organized active material (for example, $LaSi_2$/Si) including titanium, vanadium, chromium, manganese, nickel, copper, or lanthanum; and SnO, $SnO_2$, $SnSiO_3$, SnS, $SnS_2$, or $SnSiS_3$. In addition, a composite oxide with lithium oxide, for example, $Li_2SnO_2$ can also be used.

SiO itself can be used as the negative electrode active material (metalloid oxide). In addition, Si is produced along with the operation of an all-solid state secondary battery, and thus SiO can be used as an active material (or a precursor thereof) capable of forming an alloy with lithium.

The shape of the negative electrode active material is not particularly limited, but is preferably a particle shape. The average particle size of the negative electrode active material is preferably 0.1 to 60 μm. In order to obtain a predetermined particle size, an ordinary pulverizer or classifier is used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method. The average particle size of negative electrode active material particles can be measured using the same method as the method of measuring the volume average particle size of the positive electrode active material.

As the negative electrode active material, one kind may be used alone, or two or more kinds may be used in combination.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specifically, titanium oxide spinel, tantalum-based oxides, niobium-based oxides, or lithium niobate-based compounds can be used, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $T_1O_2$, $ZrO_2$, $Al_2O_3$, and $B_2O_3$.

In addition, a surface treatment may be carried out on the surfaces of electrodes including the positive electrode active material or the negative electrode active material using sulfur or phosphorous.

Furthermore, the particle surfaces of the positive electrode active material or the negative electrode active material may be treated with an actinic ray or an active gas (plasma or the like) before or after the coating of the surfaces.

<Distributing Component>

The distributing component used in the present invention may consist of a binder or may consist of a binder and a conductive auxiliary agent. "Distributing component" is a component that is selectively distributed to the inorganic solid electrolyte in the electrode active material layer according to the embodiment of the present invention at a ratio of higher than 60%, and is a component that is a calculation target for the distribution rate in a measurement method described in Examples. Examples of this component include a binder and a conductive auxiliary agent. In addition the above-described components, for example, a dispersant and a thickener can also be used.

As described above, the distribution rate of the distributing component to the inorganic solid electrolyte in the electrode active material layer formed of the electrode composition according to the embodiment of the present invention exceeds 60%. The distribution rate of the distributing component to the inorganic solid electrolyte is preferably 70% or higher, more preferably 74% or higher, still more preferably 80% or higher, still more preferably 82% or higher, and still more preferably 90% or higher. The upper limit may be 100%. In the present invention, the distribution rate is a value calculated using the method described in Examples.

In a case where the distribution rate exceeds 60%, a sufficient inorganic solid electrolyte-polymer network is formed in the electrode active material layer, the film hardness of the electrode active material layer is improved, and the cycle characteristics of the all-solid state secondary battery are improved. The distribution rate can be adjusted by adjusting the mixing order of the components in the electrode composition, the content of the repeating unit having an amino group, a sulfanyl group, a hydroxy group, or an anone group with respect to all the components in the polymer forming the binder, and the like.

(Binder)

The polymer forming the binder used in the present invention includes a repeating unit having an amino group, a sulfanyl group, a hydroxy group, a carboxy group, or an anone group (that is, a repeating unit having at least one of an amino group, a sulfanyl group, a hydroxy group, a carboxy group, or an anone group). The content of the repeating unit with respect to all the components of the polymer is not particularly limited and is preferably 1% to 60 mass %, more preferably 2% to 50 mass %, and still more preferably 5% to 40 mass %.

In a case where the polymer forming the binder used in the present invention has the above-described functional group, binding properties between the inorganic solid electrolyte and the distributing component (in particular, the binder) can be improved, and the film hardness can be improved.

As described above, it is preferable that an adsorption rate A of the binder used in the present invention to the active material and an adsorption rate B of the binder used in the present invention to the inorganic solid electrolyte satisfy the following Expressions I) and II). In the present invention, the Adsorption rates A and B are values calculated using the method described in Examples.

Adsorption Rate $B \geq 20\%$                                              Expression I)

Adsorption Rate $B >$ Adsorption Rate $A$                 Expression II)

In a case where the polymer forming the binder satisfies Expression I), particles of the inorganic solid electrolyte are sufficiently bound. In a case where the polymer forming the binder satisfies Expression II), the film hardness of the electrode active material layer and the cycle characteristics of the all-solid state secondary battery can be improved. The adsorption rate A and the adsorption rate B can be adjusted by adjusting the content of the repeating unit having an amino group, a sulfanyl group, a hydroxy group, or an anone group with respect to all the components in the polymer forming the binder, and the like.

In order to further improve the film hardness prepared using the electrode composition according to the embodiment of the present invention to further improve the cycle characteristics of the all-solid state secondary battery including the electrode active material layer, the adsorption rate A is preferably 25% or lower and may be 10% or lower. The lower limit is preferably 0.1% or higher and more preferably 1% or higher.

The adsorption rate B is preferably 20% or higher, more preferably 50% or higher, still more preferably 80% or higher, and still more preferably 90% or higher. The upper limit is preferably 99.9% or lower and more preferably 99.0% or lower.

The polymer forming the binder may be soluble in the dispersion medium and, from the viewpoint of ion conductivity, is preferably insoluble (insoluble particles) in the dispersion medium.

In the present invention, the polymer being insoluble in the dispersion medium represents that, even in a case where the polymer is added to the dispersion medium (the amount used is 10 times the mass of the polymer) at 30° C. and is left to stand for 24 hours, the amount of the polymer dissolved in the dispersion medium is 3 mass % or lower, preferably 2 mass % or lower, and more preferably 1 mass % or lower. The amount of the polymer dissolved refers to the ratio of the polymer mass obtained from the dispersion medium having undergone solid-liquid separation after 24 hours to the polymer mass added to the dispersion medium.

The binder may be present in the electrode composition in a state where it is dissolved in, for example, the dispersion medium, and may be present (preferably, dispersed) in the form of a solid without being dissolved in the dispersion medium (the binder that is present in the form of a solid will be referred to as "particle binder"). In the present invention, it is preferable that the binder is the particle binder in the electrode composition and further in the electrode active material layer (applied and dried layer) from the viewpoints of battery resistance and cycle characteristics.

In a case where the binder is the particle binder, the shape thereof is not particularly limited and may be a flat shape, an unstructured shape, or the like and is preferable a spherical shape or a granular shape.

The average particle size of the particle binder is not particularly limited, and is preferably 1000 nm or less, more preferably 500 nm or less, and still more preferably 300 nm or less. The lower limit value is 1 nm or more, preferably 5 nm or more, more preferably 10 nm or more, and still more preferably 50 nm or more.

Unless specified otherwise, the average particle size of the particle binder is limited to measurement conditions and a definition described below.

The particle binder is diluted using an appropriate solvent (for example, diisobutyl ketone) in a 20 mL sample bottle to prepare 1 mass % of a dispersion liquid. The diluted dispersion sample is irradiated with 1 kHz ultrasonic waves for 10 minutes and is then immediately used for testing. The volume average particle size is obtained by acquiring data 50 times using this dispersion liquid sample, a laser diffraction/scattering particle size distribution analyzer LA-920 (trade name, manufactured by Horiba Ltd.), and a quartz cell for measurement at a temperature of 25° C. The obtained volume average particle size is set as the average particle size. Other detailed conditions and the like can be found in JIS Z8828: 2013 "Particle Size Analysis-Dynamic Light Scattering" as necessary. For each level, five samples are prepared and measured, and the average value thereof is adopted.

The average particle size of the particle binder in the active material layer of the all-solid state secondary battery can be measured, for example, by disassembling the all-solid state secondary battery to peel off an active material layer, measuring the average particle size of a material of the active material layer using the above-described method of measuring the average particle size of the particle binder, and excluding the measured value of the average particle size of the particles other than the particle binder obtained in advance from the average particle size of the material.

The kind of the polymer forming the binder used in the present invention is not particularly limited as long as the polymer can adjust the distribution rate of the distributing component to the inorganic solid electrolyte in the electrode active material layer to exceed 60% and the polymer includes the repeating unit having an amino group, a sulfanyl group, a hydroxy group, a carboxy group, or an anone group. For example, a polymer having an amide bond, a urea bond, or a urethane bond is preferable. Examples of the binder used in the present invention include a binder that can adjust the distribution rate to exceed 60% among binders (polymers) described in JP2018-044111A, JP2015-088486A, JP2015-167126A, and JP2016-035911A. Any one of a chain polymerization type polymer or a sequential polymerization type polymer can be used.

Hereinafter, a polymer forming a binder (A) that is preferably used in the present invention will be described.

This polymer includes a main chain including at least one bond selected from the group consisting of an amide bond, a urea bond, and a urethane bond. In addition, this polymer includes a component having a side chain that satisfies conditions A and B described below as a component forming the polymer. In addition, this polymer has an amino group, a sulfanyl group, a hydroxy group, a carboxy group, or an anone group. This polymer may have an amino group, a sulfanyl group, a hydroxy group, a carboxy group, or an anone group at any one of a main chain or a side chain, preferably has an amino group, a sulfanyl group, a hydroxy group, or a carboxy group at a main chain, and preferably has an anone group at a side chain.

In the present invention, a main chain of the polymer refers to a linear molecular chain in which all the molecular chains forming the polymer other than the main chain can be considered branched chains or pendants to the main chain. Typically, the longest chain among the molecular chains forming the polymer is the main chain. In this case, a functional group at a polymer terminal is not included in the main chain. In addition, side chains of the polymer refers to molecular chains other than the main chain and include a short molecular chain and a long molecular chain.

(Main Chain of Polymer)

The main chain of the polymer includes at least one bond selected from the group consisting of an amide bond, a urea bond, and a urethane bond. The bonds in the main chain contribute to the improvement of the film hardness of the electrode active material layer by forming a hydrogen bond. Accordingly, the hydrogen bond that is formed by the bonds may be formed of the bonds or may be of the bond and another partial structure in the main chain. From the viewpoint that a hydrogen bond can be formed, it is preferable that the bonds have a hydrogen atom for forming a hydrogen bond (a nitrogen atom of each of the bonds is unsubstituted).

The bond is not particularly limited as long as it is included in the main chain of the polymer and may be in any one of an aspect where it is included in a constitutional unit (repeating unit) and/or an aspect where it is included as a bond that links different constitutional units to each other. In addition, the bonds in the main chain are not limited to one kind and may be two or more kinds. In this case, the binding mode of the main chain is not particularly limited. The main chain may be a main chain where two or more bonds are randomly present or may be a segmented main chain including a segment having a specific bond and a segment having another bond.

The main chain having the bond is not particularly limited, and a main chain including at least one segment selected from polyamide, polyurea, or polyurethane is preferable, and a main chain consisting of polyamide, polyurea, or polyurethane is more preferable. Specifically, the main chain having the bond may be a main chain including a combination of two or more kinds (preferably two to eight kinds) of components represented by the following Formulae (I-1) to (I-4). The combination of the respective components is appropriately selected depending on the bond.

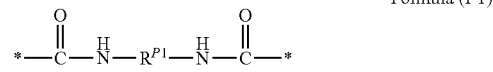

Formula (I-1)

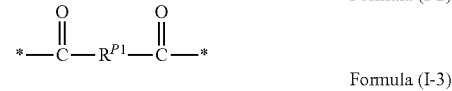

Formula (I-2)

Formula (I-3)

Formula (I-4)

In the formulae, $R^{P1}$ and $R^{P2}$ each independently represent a hydrocarbon group or a molecular chain having a mass average molecular weight of 200 to 200,000.

$R^{P1}$ represents preferably a hydrocarbon group and more preferably an aromatic hydrocarbon group. $R^{P2}$ represents preferably an aliphatic hydrocarbon group or the above-described molecular chain and more preferably an aspect an aliphatic hydrocarbon group and the above-described molecular chain are independently included. In this aspect, the components represented by Formula (I-3) or Formula (I-4) include two components including a component in which $R^{P2}$ represents an aliphatic hydrocarbon group and a component in which $R^{P2}$ represents the above-described molecular chain.

The hydrocarbon group that can be used as $R^{P1}$ and $R^{P2}$ is a hydrocarbon group having a mass average molecular weight of lower than 200, and examples thereof include an aliphatic or aromatic hydrocarbon group. As the hydrocarbon group, an alkylene group (having preferably 1 to 12 carbon atoms, more preferably 1 to 6 carbon atoms, and still more preferably 1 to 3 carbon atoms), an arylene group (having preferably 6 to 14 carbon atoms, and still more preferably 6 to 10 carbon atoms), or a group including a combination of the above-described groups is preferable. As the hydrocarbon group that can be used as $R^{P2}$, an alkylene group is more preferable, an alkylene group having 2 to 6 carbon atoms is still more preferable, and an alkylene group having 2 or 3 carbon atoms is still more preferable.

Examples of the hydrocarbon group that can be used as $R^{P1}$ and $R^{P2}$ include a hydrocarbon group represented by the following Formula (M2) and a group having an oxygen atom, a sulfur atom, or an imino group, for example, N,N'-bis(2-hydroxyethyl)oxamide.

The aliphatic hydrocarbon group is not particularly limited, and examples thereof include a hydrogen reduced form of an aromatic hydrocarbon group represented by Formula (M2) and a partial structure (for example, a group composed of isophorone) in a well-known aliphatic diisocyanate compound.

As the aromatic hydrocarbon group, a hydrocarbon group represented by the following Formula (M2) is preferable.

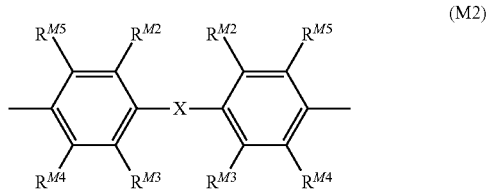

(M2)

In Formula (M2), X represents a single bond, —CH$_2$—, —C(CH$_3$)$_2$—, —SO$_2$—, —S—, —CO—, or —O—. From the viewpoint of binding properties, —CH$_2$— or —O— is preferable, and —CH$_2$— is more preferable. The alkylene group described herein may be substituent with a halogen atom (preferably a fluorine atom).

$R^{M2}$ to $R^{M5}$ each independently represent a hydrogen atom or a substituent and preferably a hydrogen atom. The substituent that can be used as $R^{M2}$ to $R^{M5}$ is not particularly limited, and examples thereof include an alkyl group having 1 to 20 carbon atoms, an alkenyl group having 1 to 20 carbon atoms, —OR$^{M6}$, —N(R$^{M6}$)$_2$, —SR$^{M6}$ (R$^{M6}$ represents a substituent and preferably an alkyl group having 1 to 20 carbon atoms or an aryl group having 6 to 10 carbon atoms), and a halogen atom (for example, a fluorine atom, a chlorine atom, or a bromine atom). Examples of —N(R$^{M6}$)$_2$ include an alkylamino group (having preferably 1 to 20 carbon atoms and more preferably 1 to 6 carbon atoms) and an arylamino group (having preferably 6 to 40 carbon atoms and more preferably 6 to 20 carbon atoms).

As the above-described molecular chain that can be used as $R^{P1}$ and $R^{P2}$, a hydrocarbon chain, a polyalkylene oxide chain, a polycarbonate chain, or a polyester chain is preferable, a hydrocarbon chain or a polyalkylene oxide chain is more preferable, and a hydrocarbon chain, a polyethylene oxide chain, or a polypropylene oxide chain is still more preferable.

The hydrocarbon chain is not particularly limited and is composed of preferably 18 or more carbon atoms, more preferably 30 or more carbon atoms, and still more preferably 50 or more carbon atoms. The upper limit is not particularly limited and is, for example, 90. This hydrocarbon chain may include a carbon-carbon unsaturated bond or may include a ring structure of an aliphatic ring and/or an aromatic ring. That is, the hydrocarbon chain may be a hydrocarbon chain including a hydrocarbon group selected from an aliphatic hydrocarbon group or an aromatic hydrocarbon group. It is preferable that the hydrocarbon chain is a hydrocarbon chain including an aliphatic hydrocarbon group. It is preferable that the hydrocarbon chain is an aliphatic saturated hydrocarbon group or an aliphatic unsaturated hydrocarbon group that satisfies the number of carbon atoms, or a polymer (preferably an elastomer). Examples of the polymer include a diene polymer having a double bond in a main chain and a non-diene polymer not having a double bond in a main chain. Examples of the diene polymer include a styrene-butadiene copolymer, a styrene-ethylene-butadiene copolymer, a copolymer (preferably butyl rubber (IIR)) of isobutylene and isoprene, a butadiene polymer, an isoprene polymer, and an ethylene-propylene-diene copolymer. Examples of the non-diene polymer include an olefin polymer such as an ethylene-propylene copolymer or a styrene-ethylene-butylene copolymer and a hydrogen reduced form of the above-described diene polymer.

Examples of the polyalkylene oxide chain include a chain consisting of a well-known chain consisting of polyalkylene oxide. The number of carbon atoms in the alkyleneoxy group as the component is preferably 1 to 8, more preferably 1 to 6, and still more preferably 2 or 3 (a polyethylene oxide chain or a polypropylene oxide chain).

Examples of the polycarbonate chain or the polyester chain include a chain consisting of a well-known polycarbonate or polyester.

In a case where the above-described molecular chain is a polyalkylene oxide chain, a polycarbonate chain or a polyester chain, it is preferable that an alkyl group (having preferably 1 to 12 carbon atoms and more preferably 1 to 6 carbon atoms) is present at a terminal.

In the alkyl group in the molecular chain, an ether group (—O—), a thioether group (—S—), a carbonyl group (>C=O), or an imino group (>NR$^N$: R$^N$ represents a hydrogen atom, an alkyl group having 1 to 6 carbon atoms, or an aryl group having 6 to 10 carbon atoms) may be present.

The mass average molecular weight of the above-described molecular chain is preferably 250 or higher, more preferably 500 or higher, still more preferably 700 or higher, and still more preferably 1,000 or higher. The upper limit is preferably 100,000 or lower and more preferably 10,000 or lower. The mass average molecular weight of the molecular chain is measured for a raw material compound before being incorporated into the main chain of the polymer.

A raw material compound (diisocyanate compound) for deriving the component represented by Formula (I-1) is not particularly limited, and examples thereof include a diisocyanate compound represented by Formula (M1) and specific examples thereof described in WO2018/020827A. A raw material compound (for example, a carboxylic acid or an acid chloride thereof) for deriving the component represented by Formula (I-2) is not particularly limited, and examples thereof include a compound represented by Formula (M1) and specific examples thereof described in WO2018/020827A.

A raw material compound (diol compound or diamine compound) for deriving the component represented by Formula (I-3) or Formula (I-4) is not particularly limited, and examples thereof include each compound and specific examples thereof described in WO2018/020827A, and dihydroxyoxamide.

$R^{P1}$ and $R^{P2}$ may each independently have a substituent. The substituent is not particularly limited, and examples thereof include the substituents that can be used as $R^{M2}$ and a group corresponding to a side chain described below. It is preferable that $R^{P1}$ and $R^{P2}$ have an amino group, a sulfanyl group, a hydroxy group, or a carboxy group, and it is more preferable that $R^{P2}$ in Formula (I-3) has an amino group, a sulfanyl group, a hydroxy group, or a carboxy group.

(Component Having Side Chain)

It is preferable that the polymer forming the binder includes a component having a specific side chain described below. This side chain may be incorporated into any component as long as the component is a component forming the polymer, and may be incorporated into any one of the components represented by Formulae (I-1) to (I-4). In particular, it is preferable that the side chain is incorporated into the component represented by Formula (I-3) or (I-4), and it is more preferable that the side chain is incorporated into a component in which $R^{P2}$ represents an aliphatic hydrocarbon group among the components represented by Formula (I-3) or (I-4). In a case where this component has the specific side chain, the component is likely to interact with a negative electrode active material.

—Side Chain—

It is preferable that the side chain in the polymer forming the binder satisfies the following conditions A and B.

Condition A: a chain structural unit spaced from an atom forming the main chain by four or more atoms has at least one group selected from the group consisting of a carbonyl group, a thiocarbonyl group, and a phosphoryl group (>P(=O)—)

Condition B: any one of the carbonyl group, the thiocarbonyl group, or the phosphoryl group is not bonded to a hydroxy group.

In the condition A, the chain structural unit at the side chain refers to a structural unit on the side chain terminal side at the side chain spaced from the atom forming the molecular chain of the main chain by four or more atoms. For example, in a case where the molecular chain of the main chain has an alkylene group and the side chain is bonded to a carbon atom (main chain-forming carbon atom) forming the alkylene group, "the chain structural unit spaced from an atom forming the main chain by four or more atoms has at least one group selected from the group consisting of a carbonyl group, a thiocarbonyl group, and a phosphoryl group (>P(=O)—)" represents that the number of linking atoms from an atom bonded to the main chain-forming carbon atom as a starting point to a carbon atom of a carbonyl group, a sulfur atom of a thiocarbonyl group, or a phosphorus atom of a phosphoryl group (the linking atoms includes the atom at the starting point and the carbon atom of a carbonyl group, the sulfur atom of the thiocarbonyl group, or the phosphorus atom of the phosphoryl group) is 4 or more.

More specifically, in a component A-1 described below, a sulfur atom bonded to a carbon atom forming a molecular chain (ethylene dioxide chain) of the main chain is used as a starting point, and in a linking atom chain (molecular chain including 6 linking atoms of —S—C—C (tertiary carbon atom)-C (carbonyl carbon atom)-O—C (a carbon atom of a methyl group), a portion (C (carbonyl carbon atom)-O—C (a carbon atom of a methyl group) in terms of linking atoms) spaced from the sulfur atom by four or more linking atoms is the chain structural unit. In addition, in a component A-5 described below, a sulfur atom bonded to a carbon atom forming a molecular chain (ethylene dioxide chain) of the main chain is used as a starting point, and in a linking atom chain (—S—C—C—C (carbonyl carbon atom)-C—C—C), a portion (—C(carbonyl carbon atom)-C—C—C in terms of linking atoms) spaced from the sulfur atom by four or more linking atoms is the chain structural unit. In a case where the number of portions spaced from the sulfur atom by four or more linking atoms is two or more as in the component A-5, a portion having a smaller number of linking atoms is adopted.

The side chain has at least one group selected from the group consisting of a carbonyl group, a thiocarbonyl group, and a phosphoryl group (>P(=O)—) in the above-described chain structural unit. As a result, a strong interaction with the electrode active material occurs along with easy molecular motion of the side chain.

It is preferable that the chain structural unit has a carbonyl group among the groups defined by the condition A.

The carbonyl group, the thiocarbonyl group, and the phosphoryl group (>P(=O)—) does not have a hydroxy group as a terminal portion of the chain structural unit (condition B). Further, it is preferable that these groups are not bonded to a hydrogen atom. That is, it is preferable that the groups are incorporated into the chain structural unit. Among direct bonds of the phosphoryl group, two direct bonds are used to incorporate the phosphoryl group into the chain structural unit, and the remaining direct bond is bonded to a substituent other than a hydrogen atom and a hydroxy group. This substituent is not particularly limited, and examples thereof substituents that can be used as $R^1$ and $R^2$.

The above-described group in the chain structural unit is not particularly limited as long as at least one group is present in one chain structural unit (component). For example, the number of the above-described groups is 1 to 10 and, from the viewpoint of the interaction with the electrode active material, is preferably 1 to 5 and more preferably 1 to 3. In a case where the above-described group in the chain structural unit is defined by mass ratio, a ratio $[W^G/W^S]$ of a total mass $W^G$ of the above-described group to a total mass $W^S$ of the chain structural unit is preferably 0.05 or higher, more preferably 0.1 or higher, still more preferably 0.2 or higher, and still more preferably 0.3 or higher. The upper limit is not particularly limited, may be, for example, 0.7 or lower, and is preferably 0.65 or lower.

In a case where the chain structural unit has a branched chain (for example, a substituent), the mass of the branched structure and the mass of a hydrogen atom at a terminal portion of the molecular chain are also included in the total mass of the chain structural unit.

The number of the above-described groups in one molecule of the polymer is appropriately set.

As the kind of the above-described group in the chain structural unit, at least one kind may be used, and two or more kinds may be used.

It is preferable that the side chain has a partial structure represented by any one of the following Formulae (I) to (III), it is more preferable that the side chain has a partial structure represented by any one of the following Formula (II) or (III), and it is still more preferable that the side chain has a partial structure represented by any one of the following Formula (II).

The position where the partial structure is incorporated into the side chain is not particularly limited as long as a carbon atom of a carbonyl group in each of the structures is incorporated into a position spaced from an atom forming the main chain by four or more atoms. The partial structure represented by Formula (III) is not particularly limited as long as a carbon atom of at least one carbonyl group in each of the structures is incorporated into a position spaced from an atom forming the main chain by four or more atoms.

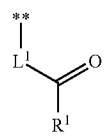

(I)

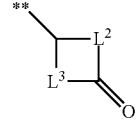

(II)

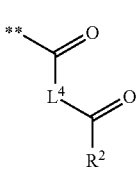

(III)

In the formula, $L^1$ to $L^4$ each independently represent a linking group.

The linking group that can be used as $L^1$ to $L^4$ is not particularly limited, and examples thereof include an alkylene group (having preferably 1 to 30 carbon atoms, more preferably 1 to 20 carbon atoms, still more preferably 1 to 10 carbon atoms, still more preferably 1 to 6 carbon atoms, and still more preferably 1 to 3 carbon atoms), an arylene group (having preferably 6 to 24 carbon atoms, more preferably 6 to 14 carbon atoms, and still more preferably 6 to 10 carbon atoms), a heteroarylene group having 3 to 12 carbon atoms, an ether group (—O—), a sulfide group (—S—), a carbonyl group, an imino group (—NR$^N$—: R$^N$ represents a binding site, a hydrogen atom, an alkyl group having 1 to 6 carbon atoms, or an aryl group having 6 to 10 carbon atoms), and a linking group including a combination of two or more thereof (preferably 2 to 10). In particular, as the linking group that can be used as $L^1$ to $L^4$, an alkylene group is preferable. As the linking group that can be used as $L^4$, methylene is more preferable. The number of members of a ring that is formed by $L^2$ and $L^3$ with two carbon atoms in the formula is not particularly limited. For example, a 4- to 8-membered ring is preferable a 5- or 6-membered ring is more preferable, and a 6-membered ring (preferably an aspect where the partial structure represented by Formula (II) is an anone group) is still more preferable.

In Formula (I) and Formula (III), $R^1$ and $R^2$ each independently represent a substituent. In this case, $R^1$ does not represent "-$L^4$-CO—$R^2$" in Formula (II).

The substituent that can be used as $R^1$ and $R^2$ is not particularly limited, and examples thereof include an alkyl group (having preferably 1 to 12 carbon atoms, more preferably 1 to 6 carbon atoms, still more preferably 1 to 3 carbon atoms), an aryl group (having preferably 6 to 22 carbon atoms, more preferably 6 to 14 carbon atoms, still more preferably 6 to 10 carbon atoms), and a heteroatom. The heteroatom is not particularly limited. For example, an oxygen atom, a sulfur atom, a nitrogen atom, or a phosphorus atom is preferable. Examples of the group having a heteroatom include a group having a heteroatom therein and a group bonded to a carbonyl carbon atom in each of the formulae through the heteroatom. Examples of the group having a heteroatom include a heterocyclic group (preferably a heterocyclic group having 2 to 20 carbon atoms and more preferably a 5- or 6-membered heterocyclic group having at least one oxygen atom, sulfur atom, or nitrogen atom; the heterocyclic group includes an aromatic heterocyclic group and an aliphatic heterocyclic group), an alkoxy group, an aryloxy group, a heterocyclic oxy group, an alkylthio group, an arylthio group, and a heterocyclic thio group.

As the substituent that can be used as $R^1$, a group having a heteroatom (preferably 1 to 10 carbon atoms) is preferable. As the substituent that can be used as $R^2$, an alkyl group is preferable.

The number of carbon atoms in the alkoxy group and the alkylthio group is preferably 1 to 10, more preferably 1 to 6, and still more preferably 1 to 3. The number of carbon atoms in the aryloxy group and the arylthio group is preferably 6 to 24, more preferably 6 to 14, and still more preferably 6 to 10.

$R^1$, $R^2$, $L^1$, and $L^4$ may have an amino group, a sulfanyl group, a hydroxy group, or a carboxy group.

The substituent that can be used as $R^1$ and $R^2$ may further have a substituent, and examples of this substituent include an alkyl group, an aryl group, an amino group, a phosphoryl group, an ether group, and a linking group including a combination of two or more thereof (preferably 2 to 10).

The substituent that can be used as $R^1$ and $R^2$ may be bonded to $L^1$, $L^4$, or a linking group through which a structure represented by any one of the above-described formulae described below and the main chain of the polymer to form a ring such as a cyclohexane ring.

In each of the formulae, ** represents a binding site to the main chain (the atom forming the main chain) of the polymer.

The partial structure represented by Formula (II) or (Ill) may be bonded to the main chain of the polymer directly or through a linking group. The linking group through which the partial structure represented by Formula (II) or (III) and the main chain of the polymer are bonded is not particularly limited, and examples thereof include a linking group that can be used as $L^1$ to $L^4$. In particular, an alkylene group, an arylene group, a heteroarylene group, an ether group, a sulfide group, a carbonyl group, an imino group, or a linking group including a combination of two or more thereof (preferably 2 to 10) is preferable, and a sulfide group, an alkylene group, or a linking group including a combination thereof is more preferable.

In the present invention, the number of atoms forming the linking group is preferably 1 to 30, more preferably 1 to 20, and still more preferably 1 to 15. The number of linking atoms in the linking group is preferably 1 to 15 and more preferably 1 to 12. The number of linking atoms refers to the minimum number of atoms that connect predetermined structural units. For example, in the case of —C(=O)—O—, the number of atoms forming the linking group is 3, but the number of linking atoms is 2.

Hereinafter, specific examples of the component having the side chain that satisfies the conditions A and B will be shown. However, the present invention is not limited to Examples.

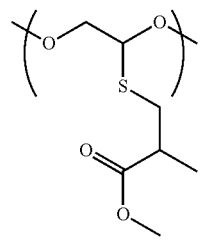

A-1

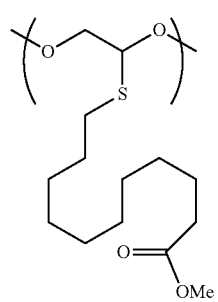

A-2

-continued

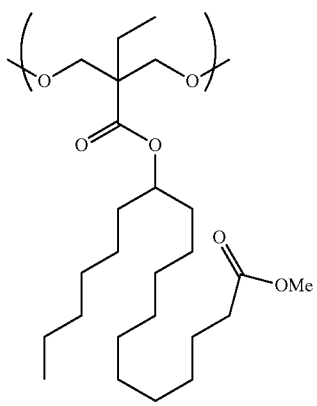
A-3

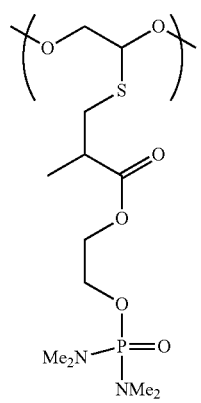
A-4

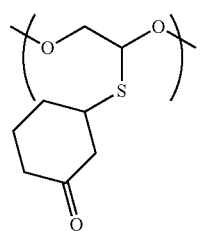
A-5

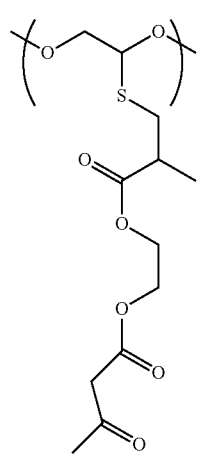
A-6

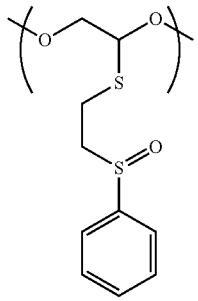
A-7

In the polymer including the component having the side chain that satisfies the conditions A and B, the content of the component can be appropriately set.

It is preferable that the content of each of the components with respect to the total mol number of all the components forming the polymer is determined such that the total content of the components is 100 mol %.

From the viewpoint of improving the film hardness by the formation of a hydrogen bond or the like, the content of the component (the component M1 in Examples described below) in which $R^{P1}$ represents a hydrocarbon group among the components represented by Formula (I-1) or (I-2) is preferably 10% to 50 mol %, more preferably 20% to 50 mol %, and still more preferably 30% to 50 mol % with respect to all the components forming the polymer.

From the viewpoint of improving the film hardness by the formation of a hydrogen bond or the like, the content of the component (the component M2 in Examples described below) in which $R^{P2}$ represents a hydrocarbon group among the components represented by Formula (I-3) or (I-4) is preferably 1% to 50 mol %, more preferably 2% to 40 mol %, still more preferably 3% to 30 mol %, and still more preferably 3% to 20 mol % with respect to all the components forming the polymer.

The content of each of the components does not include the content of the component having the side chain, which is the content of components not having the side chain.

From the viewpoint of improving the film hardness, the content of the component in which $R^{P2}$ represents the above-described molecular chain among the components represented by Formula (I-1) or (I-2) is preferably 10% to 50 mol %, more preferably 20% to 50 mol %, and still more preferably 30% to 50 mol % with respect to all the components forming the polymer.

From the viewpoint of improving the film hardness, the content of the component (a component M4 in Examples described below) in which $R^{P1}$ represents the above-described molecular chain among the components represented by Formula (I-3) or (I-4) is preferably 1% to 50 mol %, more preferably 2% to 45 mol %, still more preferably 15% to 45 mol %, and still more preferably 30% to 45 mol % with respect to all the components forming the polymer.

The content of each of the components does not include the content of the component having the side chain, which is the content of components not having the side chain.

From the viewpoint of improving cycle characteristics, the content of the component (a component M3 in Examples described below) having the side chain is preferably 0% to 20 mol %, more preferably 0% to 15 mol %, and still more preferably 0% to 10 mol % with respect to all the components forming the polymer. The lower limit may be 1 mol % or may be 2 mol %.

In a case where the polymer includes components other than the above-described components, the content of the other components is preferably 15 mol % or lower with respect to all the components forming the polymer.

It is preferable that the content of each of the components with respect to the total mass of all the components forming the polymer is determined such that the total content of the components is 100 mass %.

From the viewpoint of improving the film hardness by the formation of a hydrogen bond or the like, the content of the component (the component M1 in Examples described below) in which $R^{P1}$ represents a hydrocarbon group among the components represented by Formula (I-1) or (I-2) is preferably 20% to 80 mass %, more preferably 30% to 70 mass %, and still more preferably 35% to 60 mass % with respect to the total mass of all the components forming the polymer.

From the viewpoint of improving the film hardness by the formation of a hydrogen bond or the like, the content of the component (the component M2 in Examples described below) in which $R^{P2}$ represents a hydrocarbon group among the components represented by Formula (I-3) or (I-4) is preferably 0% (preferably higher than 0%) to 80 mass %, more preferably 0% (preferably higher than 0%) to 70 mass %, and still more preferably 0% (preferably higher than 0%) to 60 mass % with respect to the total mass of all the components forming the polymer.

The content of each of the components does not include the content of the component having the side chain, which is the content of components not having the side chain.

From the viewpoint of improving the film hardness, the content of the component in which $R^{P1}$ represents the above-described molecular chain among the components represented by Formula (I-1) or (1-2) is preferably 0% (preferably higher than 0%) to 80 mass %, more preferably 0% (preferably higher than 0%) to 70 mass %, and still more preferably 0% (preferably higher than 0%) to 60 mass % with respect to the total mass of all the components forming the polymer.

From the viewpoint of improving the film hardness, the content of the component (the component M4 in Examples described below) in which $R^{P2}$ represents the above-described molecular chain among the components represented by Formula (I-3) or (I-4) is preferably 0% (preferably higher than 0%) to 80 mass %, more preferably 0% (preferably higher than 0%) to 70 mass %, and still more preferably 30% (preferably higher than 0%) to 60 mass % with respect to the total mass of all the component forming the polymer.

The content of each of the components does not include the content of the component having the side chain, which is the content of components not having the side chain.

From the viewpoint of improving cycle characteristics, the content of the component (the component M3 in Examples described below) having the side chain is preferably 5% to 40 mass %, more preferably 5% to 20 mass %, and still more preferably 5% to 10 mass % with respect to the total mass of all the components forming the polymer.

In a case where the polymer includes components other than the above-described components, the content of the other components is preferably 15 mass % or lower with respect to all the components forming the polymer.

The polymer can be synthesized by polycondensation of raw material compounds using a well-known method depending on the kind of the bond having the main chain. The synthesis method can refer to, for example, "<Synthesis method of Polymer (B)> described in WO2018/020827A.

—Mass Average Molecular Weight—The mass average molecular weight (M. w.) of the polymer is not particularly limited.

For example, the mass average molecular weight is preferably 3,000 or higher, more preferably 5,000 or higher, and still more preferably 7,000 or higher. The upper limit is practically 1,000,000 or lower, preferably 300,000 or lower, more preferably 200,000 or lower, and still more preferably 40,000 or lower.

—Measurement of Molecular Weight—

In the present invention, as the mass average molecular weight, a mass average molecular weight in terms of standard polystyrene is measured by gel permeation chromatography (GPC). Regarding a measurement method, basically, a value measured using a method under the following condition 1 or condition 2 (preferred) is used. An appropriate eluent may be appropriately selected and used depending on the kind of the polymer to be measured.

(Condition 1)
Column: a column in which two TOSOH TSKgel Super AWM-H's are linked
Carrier: 10 mM LiBr/N-methylpyrrolidone
Measurement temperature: 40° C.
Carrier flow rate: 1.0 ml/min
Sample concentration: 0.1 mass %
Detector: refractive index (RI) detector
(Condition 2)
Column: a column in which TOSOH TSK gel Super HZM-H, TOSOH TSK gel Super HZ4000, and TOSOH TSK gel Super HZ2000 are linked to each other
Carrier: tetrahydrofuran
Measurement temperature: 40° C.
Carrier flow rate: 1.0 ml/min
Sample concentration: 0.1 mass %
Detector: refractive index (RI) detector The polymer may be a non-crosslinked polymer or a crosslinked polymer. In addition, in a case where the cross-linking of the polymer progresses due to heating or voltage application, the molecular weight may be higher than the above-described molecular weight.

At the start of using the all-solid state secondary battery, the mass average molecular weight of the polymer is preferably in the above-described range.

—Moisture Content—

The moisture content of the polymer is preferably 100 ppm (by mass) or lower. In addition, the polymer may be dried by crystallization, or the polymer dispersion liquid may be used as it is.

—Glass Transition Temperature—

The glass transition temperature of the polymer is not particularly limited and is preferably 30° C. or lower, more preferably 25° C. or lower, still more preferably 15° C. or lower, and still more preferably 5° C. or lower. The lower limit of the glass transition temperature is not particularly limited, can be set to, for example, −200° C., and is preferably −150° C. or higher and more preferably −120° C. or higher.

The glass transition temperature (Tg) is measured using a dry sample of the polymer as a measurement target with a differential scanning calorimeter "X-DSC7000" (trade name, manufactured by SII NanoTechnology Inc.) under the following conditions. The measurement is performed twice using the same sample, and the result of the second measurement is adopted.

Atmosphere in measuring chamber: nitrogen gas (50 mL/min)
Temperature increase rate: 5° C./min
Measurement start temperature: −100° C.
Measurement end temperature: 200° C.
Sample pan: aluminum pan
Mass of measurement sample: 5 mg
Calculation of Tg: Tg is calculated by rounding off the decimal point of an intermediate temperature between a declination start point and a declination end point in a DSC chart.

In a case where an all-solid state secondary battery is used, the glass transition temperature can be obtained, for example, by disassembling the all-solid state secondary battery to peel off an active material layer or a solid electrolyte layer, putting the active material layer or the solid electrolyte layer into water to disperse a material thereof, filtering the dispersion liquid, collecting the remaining solid, and measuring the glass transition temperature of the solid using the above-described measurement method.

In order to further improve the film hardness of the electrode active material layer formed of the electrode composition according to the embodiment of the present invention to improve cycle characteristics of the all-solid state secondary battery including the electrode active material layer, in the polymer forming the binder used in the present invention, a modulus of elasticity that is measured according to JIS K 7161 (2014) is preferably 10 to 500 MPa, more preferably 50 to 450 MPa, and still more preferably 100 to 350 MPa.

In order to further improve the film hardness of the electrode active material layer formed of the electrode composition according to the embodiment of the present invention to improve cycle characteristics of the all-solid state secondary battery including the electrode active material layer, in the polymer forming the binder used in the present invention, a tensile strain at break that is measured according to JIS K 7161 (2014) is preferably 50% to 700%, more preferably 150% 650%, and still more preferably 250% to 550%.

The tensile strain at break is a value obtained by subtracting 100% from the length of a polymer sample at break in a case where the length of the polymer sample before stretching is represented by 100%.

As the binder used in the present invention, one kind may be used alone, or two or more kinds may be used in combination.

The content of the binder in the electrode composition preferably 1 mass % or higher, more preferably 2 mass % or higher, still more preferably higher than 2 mass %, still more preferably 3 mass % or higher, and still more preferably 4 mass % or higher with respect to the solid content. The upper limit is more preferably 20 mass % or lower, more preferably 18 mass % or lower, still more preferably 16 mass % or lower, and still more preferably 14 mass % or lower.

By using the binder in the above-described range, the film hardness of the electrode active material layer formed of the electrode composition according to the embodiment of the present invention can be improved, cycle characteristics of the all-solid state secondary battery including this electrode active material layer can be further improved.

(Conductive Auxiliary Agent)

The distributing component used in the present invention may optionally include a conductive auxiliary agent used for improving, for example, the electron conductivity of the active material. As the conductive auxiliary agent, a general conductive auxiliary agent can be used. The conductive auxiliary agent may be, for example, graphite such as natural graphite or artificial graphite, carbon black such as acetylene black, Ketjen black, or furnace black, amorphous carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

In a case where the electrode composition according to the embodiment of the present invention includes the conductive auxiliary agent, the content of the conductive auxiliary agent in the electrode composition is preferably 0% to 10 mass % and more preferably 3% to 5 mass % with respect to all the solid components.

In the present invention, in a case where the negative electrode active material and the conductive auxiliary agent are used in combination, among the above-described conductive auxiliary agents, a conductive auxiliary agent that does not intercalate and deintercalate Li and does not function as a negative electrode active material during charging and discharging of the battery is classified as the conductive auxiliary agent. Whether or not the conductive auxiliary agent functions as the negative electrode active material during charging and discharging of the battery is not uniquely determined but is determined based on a combination of the conductive auxiliary agent with the negative electrode active material.

<Dispersion Medium>

The electrode composition according to the embodiment of the present invention may include a dispersion medium. In a case where the electrode composition includes the dispersion medium, composition uniformity, handleability, and the like can be improved.

The dispersion medium is not particularly limited as long as it can disperse the respective components in the electrode composition according to the present invention.

Examples of the dispersion medium to be used in the present invention include various organic solvents. Examples of the organic solvent include the respective solvents of an alcohol compound, an ether compound, an amide compound, an amine compound, a ketone compound, an aromatic compound, an aliphatic compound, a nitrile compound, and an ester compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of an ether compound include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, or diethylene glycol monobutyl ether), dialkyl ether (for example, dimethyl ether, diethyl ether, diisopropyl ether, or dibutyl ether), and cyclic ether (for example, tetrahydrofuran or dioxane (including respective isomers of 1,2-, 1,3-, and 1,4-)).

Examples of the amide compound include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric amide.

Examples of the amine compound include triethylamine, diisopropylethylamine, and tributylamine.

Examples of the ketone compound include acetone, methyl ethyl ketone (MEK), methyl isobutyl ketone, cyclohexanone, and diisobutyl ketone (DIBK).

Examples of the aromatic compound include an aromatic hydrocarbon compound such as benzene, toluene, or xylene.

Examples of the aliphatic compound include an aliphatic hydrocarbon compound such as hexane, heptane, octane, or decane.

Examples of the nitrile compound include acetonitrile, propionitrile, and isobutyronitrile.

Examples of the ester compound include a carboxylic acid ester such as ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

Examples of a non-aqueous dispersion medium include the aromatic compound and the aliphatic compound described above.

In the present invention, the dispersion medium is preferably a ketone compound, an ester compound, an aromatic compound, or an aliphatic compound and more preferably a dispersion medium including at least one selected from a ketone compound, an ester compound, an aromatic compound, or an aliphatic compound.

The number of dispersion media in the electrode composition may be one or two or more but is preferably two or more.

The total content of the dispersion medium in the electrode composition is not particularly limited and is preferably 20% to 80 mass %, more preferably 30% to 70 mass %, and still more preferably 40/6 to 60 mass %.

<Other Additives>

As components other than the above-described respective components, the electrode composition according to the embodiment of the present invention optionally includes a lithium salt, an ionic liquid, a thickener, an antifoaming agent, a leveling agent, a dehydrating agent, and an antioxidant.

[Method of Manufacturing Electrode Composition]

The electrode composition according to the embodiment of the present invention can be prepared by mixing the inorganic solid electrolyte, the active material, the distributing component, and optionally the dispersion medium or the like, for example, using various mixers that are typically used. A mixing environment is not particularly limited, and examples thereof include a dry air environment and an inert gas environment. A mixing method is not particularly limited. For example, the following mixing method can be used.

(Mixing Method A)

All the components are mixed in a lump.

(Mixing Method B)

The inorganic solid electrolyte and the binder are mixed to obtain a mixture a1, and this mixture, the active material and optionally a conductive auxiliary agent are mixed. In a case where the inorganic solid electrolyte and the binder are mixed, the dispersion medium may be mixed together. In addition, after mixing the active material and the conductive auxiliary agent to obtain a mixture b1, the mixtures a1 and b1 may be mixed.

(Mixing Method C)

The active material and the binder are mixed to obtain a mixture a2, and this mixture, the inorganic solid electrolyte, and optionally a conductive auxiliary agent are mixed. The conductive auxiliary agent may be mixed with the active material and the binder to obtain a mixture a2. In a case where the active material and the binder are mixed, the dispersion medium may be mixed together. In addition, after mixing the inorganic solid electrolyte and the conductive auxiliary agent to obtain a mixture b2, the mixtures a2 and b2 may be mixed.

In order to further improve the film hardness of the electrode active material layer formed of the electrode composition obtained with a method of manufacturing the electrode composition according to the embodiment of the present invention to improve cycle characteristics of the all-solid state secondary battery including the electrode active material layer, the mixing methods A and B are preferable, and the mixing method B is more preferable. In the mixing method B, in order to improve binding properties between particles of the inorganic solid electrolyte, the film hardness of the electrode active material layer can be improved, cycle characteristics of the all-solid state secondary battery including this electrode active material layer can be further improved.

[Electrode Sheet for All-Solid State Secondary Battery]

An electrode sheet for an all-solid state secondary battery according to the embodiment of the present invention comprises: an electrode active material layer including an inorganic solid electrolyte, an active material, and a distributing component that binds to the inorganic solid electrolyte and the active material, in which one kind of the distributing component is a binder, a polymer forming the binder includes a repeating unit having an amino group, a sulfanyl group, a hydroxy group, a carboxy group, or an anone group, and a distribution rate of the distributing component to the inorganic solid electrolyte in the electrode active material layer exceeds 60%.

An electrode sheet for an all-solid state secondary battery according to the embodiment of the present invention (simply also referred to as "electrode sheet according to the embodiment of the present invention") is not particularly limited as long as it is an electrode sheet including an active material layer, and may be a sheet in which an active material layer is formed on a substrate (current collector) or may be a sheet that is formed of an active material layer without including a substrate. The electrode sheet is typically a sheet including the current collector and the active material layer, and examples of an aspect thereof include an aspect including the current collector, the active material layer, and the solid electrolyte layer in this order and an aspect including the current collector, the active material layer, the solid electrolyte layer, and the active material layer in this order. The electrode sheet according to the embodiment of the present invention may include another layer such as a protective layer or a conductor layer (for example, a carbon coating layer). The thickness of each of the layers forming the electrode sheet according to the embodiment of the present invention is the same as the thickness of each of layers described below regarding the all-solid state secondary battery.

In the electrode sheet for an all-solid state secondary battery according to the embodiment of the present invention, at least one of a positive electrode active material layer or a negative electrode active material layer is formed of the electrode composition according to the embodiment of the present invention, and the layer has excellent film hardness.

In the present invention, an increase in the interface resistance of solid particles can also be effectively suppressed. Accordingly, the electrode sheet for an all-solid state secondary battery according to the embodiment of the present invention can be suitably used as a sheet with which an electrode active material layer of an all-solid state secondary battery can be formed.

For example, in a case where the electrode sheet for an all-solid state secondary battery is manufactured in-line in an elongated shape (is wound during transport) and used as a wound battery, cracking or the like in the active material layer can be suppressed. In a case where an all-solid state secondary battery is manufactured using the electrode sheet for an all-solid state secondary battery manufactured, excellent battery performance can be exhibited, and high productivity and yield (reproducibility) can be realized.

[Method of Manufacturing Electrode Sheet for All-Solid State Secondary Battery]

A method of manufacturing an electrode sheet for an all-solid state secondary battery according to the embodiment of the present invention is not particularly limited. For example, the electrode sheet for an all-solid state secondary battery according to the embodiment of the present invention can be manufactured by forming the electrode active material layer using the electrode composition according to the embodiment of the present invention. Examples of the method include a method of forming a film (drying and applying) of the solid electrolyte composition to form a layer (applied and dried layer) formed of the electrode composition optionally on a current collector (other layers may be interposed therebetween). As a result, the electrode sheet for an all-solid state secondary battery including optionally the current collector and the applied and dried layer can be prepared. Here, the applied and dried layer refers to a layer formed by applying the electrode composition according to the embodiment of the present invention and drying the dispersion medium (that is, a layer formed using the electrode composition according to the embodiment of the present invention and made of a composition obtained by removing the dispersion medium from the electrode composition according to the embodiment of the present invention).

Each of steps of application, drying, or the like in the method of manufacturing an electrode sheet for an all-solid state secondary battery according to the embodiment of the present invention will be described below regarding a method of manufacturing an all-solid state secondary battery.

In the method of manufacturing an electrode sheet for an all-solid state secondary battery according to the embodiment of the present invention, it is also possible to pressurize the applied and dried layer obtained as described above. Pressurization conditions or the like will be described below regarding the method of manufacturing an all-solid state secondary battery.

In addition, in the method of manufacturing an electrode sheet for an all-solid state secondary battery according to the embodiment of the present invention, it is also possible to peel the current collector, the protective layer (particularly, the release sheet), or the like.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is formed optionally on a positive electrode current collector to configure a positive electrode. The negative electrode active material layer is formed optionally on a negative electrode current collector to configure a negative electrode.

At least one of the negative electrode active material layer or the positive electrode active material layer is formed of the electrode composition according to the embodiment of the present invention, and it is preferable that both the negative electrode active material layer and the positive electrode active material layer are formed of the electrode composition according to the embodiment of the present invention. In the active material layer formed of the electrode composition according to the embodiment of the present invention, it is preferable that the kinds of components to be included and the content ratio thereof are the same as those of the solid content of the electrode composition according to the embodiment of the present invention. A well-known material can be used for the active material layer and the solid electrolyte layer that are not formed of the electrode active material layer according to the embodiment of the present invention.

The thicknesses of the negative electrode active material layer, the solid electrolyte layer, and the positive electrode active material layer are not particularly limited respectively. In consideration of the dimension of a general all-solid state secondary battery, each of the thicknesses of the respective layers is preferably 10 to 1,000 μm and more preferably 15 μm or more and less than 500 μm. In the all-solid state secondary battery according to the embodiment of the present invention, the thickness of at least one layer of the positive electrode active material layer or the negative electrode active material layer is still more preferably 50 μm or more and less than 500 μm.

Each of the positive electrode active material layer and the negative electrode active material layer may include the current collector opposite to the solid electrolyte layer.

[Case]

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short-circuit prevention.

Hereinafter, an all-solid state secondary battery according to a preferred embodiment of the present invention will be described with reference to FIG. 1. However, the present invention is not limited to the example.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and adjacent to each other. In a case in which the above-described structure is adopted, during charging, electrons (e⁻) are supplied to the negative electrode side, and lithium ions (Li⁺) are accumulated in the negative electrode side. On the other hand, during discharging, the lithium ions (Li⁺) accumulated in the negative electrode side return to the positive electrode, and electrons are supplied to an operation portion 6. In an example shown in the drawing, an electric bulb is adopted as a model of the operation portion 6 and is lit by discharging.

(Positive Electrode Active Material Layer, Solid Electrolyte Layer, and Negative Electrode Active Material Layer)

In the all-solid state secondary battery 10, both of the positive electrode active material layer and the negative electrode active material layer are formed of the electrode composition according to the embodiment of the present invention. This all-solid state secondary battery 10 exhibits excellent battery performance. The inorganic solid electrolytes and the binders in the positive electrode active material layer 4 and the negative electrode active material layer 2 may be the same as or different from each other, respectively.

In the present invention, either or both of the positive electrode active material layer and the negative electrode active material layer will also be simply referred to as the active material layer or the electrode active material layer. In addition, either or both of the positive electrode active material and the negative electrode active material will also be simply referred to as "active material" or "electrode active material".

In the present invention, it is presumed that, in a case where the above-described binder is used in combination with the solid particles such as the inorganic solid electrolyte or the active material, an increase in interface resistance between the solid particles and an increase in interface resistance between the solid particles and the current collector can also be suppressed. Therefore, the all-solid state secondary battery according to the embodiment of the present invention exhibits excellent battery characteristics.

In the all-solid state secondary battery 10, the negative electrode active material layer can be formed as a lithium metal layer. Examples of the lithium metal layer include a layer formed by deposition or forming of lithium metal powder, a lithium foil, and a lithium deposited film. The thickness of the lithium metal layer is not limited to the above-described thickness of the above-described negative electrode active material layer and may be, for example, 1 to 500 μm.

The positive electrode current collector 5 and the negative electrode current collector 1 are preferably an electron conductor.

In the present invention, either or both of the positive electrode current collector and the negative electrode current collector will also be simply referred to as the current collector.

As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet shape are used, but it is also possible to use net-shaped collectors, punched collectors, compacts of lath bodies, porous bodies, foaming bodies, or fiber groups, and the like.

The thickness of the current collector is not particularly limited, but is preferably 1 to 500 μm. In addition, it is also preferable that the surface of the current collector is made to be uneven through a surface treatment.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof. In addition, each of the layers may have a single-layer structure or a multi-layer structure.

[Manufacturing of All-Solid State Secondary Battery]

The all-solid state secondary battery can also be manufactured using an ordinary method. Specifically, the all-solid state secondary battery can be manufactured by forming the electrode active material layer using the electrode composition according to the embodiment of the present invention and the like. As a result, an all-solid state secondary battery having a low electrical resistance can be manufactured. Hereinafter, the details will be described in detail.

The all-solid state secondary battery according to the embodiment of the present invention can be manufactured through a method (the method of manufacturing an electrode sheet for an all-solid state secondary battery according to the embodiment of the present invention) including (through) a step of applying (forming a film using) the electrode composition according to the embodiment of the present invention to a metal foil also functioning as the current collector to form a coating film.

For example, the electrode composition (positive electrode composition) including a positive electrode active material is applied to a metal foil which is a positive electrode current collector so as to form a positive electrode active material layer. As a result, a positive electrode sheet for an all-solid state secondary battery is prepared. Next, the solid electrolyte composition for forming a solid electrolyte layer is applied to the positive electrode active material layer so as to form the solid electrolyte layer. Further, the electrode composition (negative electrode composition) including the negative electrode active material is applied to the solid electrolyte layer to form a negative electrode active material layer. By laminating the negative electrode current collector (metal foil) on the negative electrode active material layer, an all-solid state secondary battery having a structure in which the solid electrolyte layer is sandwiched between the positive electrode active material layer and the negative electrode active material layer can be obtained. Optionally by sealing the laminate in a case, a desired all-solid state secondary battery can be obtained.

In addition, an all-solid state secondary battery can also be manufactured by forming the negative electrode active material layer, the solid electrolyte layer, and the positive electrode active material layer on the negative electrode current collector in order reverse to that of the method of forming the respective layers and laminating the positive electrode current collector thereon.

As another method, for example, the following method can be used. That is, the positive electrode sheet for an all-solid state secondary battery is prepared as described above. In addition, a negative electrode composition is applied to a metal foil which is a negative electrode current collector so as to form a negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are prepared as described above. In addition, separately from the electrode sheets, the solid electrolyte composition is applied to a substrate to prepare a solid electrolyte sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer removed from the substrate is sandwiched therebetween. This way, an all-solid state secondary battery can be manufactured.

In the above-described manufacturing method, the electrode composition according to the embodiment of the present invention may be used as any one of the positive electrode composition or the negative electrode composition, and is preferably used as all of the compositions.

<Formation of Respective layers (Film Formation)>

The method for applying each of the compositions is not particularly limited and can be appropriately selected. Examples thereof include coating (preferably wet-type coating), spray coating, spin coating, dip coating, slit coating, stripe coating, and bar coating.

In this case, each of the compositions may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (applied and dried layer). In addition, the temperature is not excessively increased, and the respective members of the all-solid state secondary battery are not impaired, which is preferable. Therefore, in the all-solid state secondary battery, excellent total performance can be exhibited, and excellent binding properties and excellent ion conductivity can be obtained even under no pressure.

As described above, in a case where the electrode composition according to the embodiment of the present invention is applied and dried, an applied and dried layer in which solid particles are strongly bound and, in a more preferable aspect, the interface resistance between the solid particles is low can be formed.

After the application of the composition or after the preparation of the all-solid state secondary battery, the respective layers or the all-solid state secondary battery is preferably pressurized. In addition, the respective layers are also preferably compressed in a state where they are laminated. Examples of the compression method include a method using a hydraulic cylinder press machine. The pressurization pressure is not particularly limited, but is, generally, preferably in a range of 50 to 1,500 MPa.

In addition, the applied composition may be heated while being pressurized. The heating temperature is not particularly limited, but is generally in a range of 30° C. to 300° C. The respective layers or the all-solid state secondary battery can also be pressed at a temperature higher than the glass transition temperature of the inorganic solid electrolyte. In addition, the respective layers or the all-solid state secondary battery can also be pressed at a temperature higher than the glass transition temperature of the binder. In general, the pressing temperature does not exceed the melting point of the binder.

The compression may be carried out in a state in which a coating solvent or the dispersion medium has been dried in advance or in a state in which the solvent or the dispersion medium remains.

The respective compositions may be applied at the same time, and the application, the drying, and the pressing may be carried out simultaneously or sequentially. The respective compositions may be applied to separate substrates and then laminated by transfer.

The atmosphere during the compression is not particularly limited and may be any one of in the atmosphere, under the dried air (the dew point: −20° C. or lower), in an inert gas (for example, in an argon gas, in a helium gas, or in a nitrogen gas), or the like.

The pressing time may be a short time (for example, within several hours) at a high pressure or a long time (one day or longer) under the application of an intermediate pressure. In the case of members other than the electrode sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be homogeneous or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of All-Solid State Secondary Battery]

The all-solid state secondary battery according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, camcorders, liquid crystal televisions, handy cleaners, portable CDs, mini discs, electric shavers, transceivers, electronic organizers, calculators, memory cards, portable tape recorders, radios, and backup power supplies. In addition, examples of an electronic apparatus for consumer use include an automobile, an electromotive vehicle, a motor, a lighting device, a toy, a game device, a load conditioner, a timepiece, a strobe, a camera, a medical device (for example, a pacemaker, a hearing aid, or a shoulder massager). Further, the all-solid state secondary battery can be used as various cells for use in military or aerospace applications. In addition, the all-solid state secondary battery can also be combined with solar batteries.

EXAMPLES

Hereinafter, the present invention will be described in more detail on the basis of examples. However, the present invention is not interpreted to be limited to this configuration. "%" that represents compositions in the following examples is "mass %" unless specified otherwise. In the present invention, "room temperature" refers to 25° C.

Preparation Example of Binder Dispersion Liquid (Synthesis Example of Polymer)

(Preparation of Binder Dispersion Liquid Used in Condition 2 shown in Table 1 below)

0.1 g of a diol compound for deriving the following component A-5, 0.1 g of 2,2-dimethylolbutyric acid (DMBA), 12.6 g of NISSO-PB GI-1000 (trade name, manufactured by Nippon Soda Co., Ltd.), were added to a 200 mL three-neck flask and were dissolved in 71 g of tetrahydrofuran (THF). 2.4 g of diphenylmethane diisocyanate (MDI) was added to the solution, and the solution was stirred at 60° C. to uniformly dissolve the components. 270 mg of NEO-STANN U-600 (trade name, manufactured by Nitto Kasei Co., Ltd.) was added to the obtained solution, and the solution was stirred at 60° C. for 5 hours to obtain a viscous polymer solution. 0.6 g of methanol was added to the polymer solution, polymer terminals were sealed, the polymerization reaction was stopped. As a result, 20 mass % of THF solution (polymer solution) was obtained.

Next, while stirring the polymer solution obtained as described above at 350 rpm, 96 g of heptane was added dropwise for 1 hour. As a result, an emulsion of the polymer was obtained. While performing nitrogen flowing, this emulsion was heated at 85° C. for 120 minutes. 50 g of heptane was added to the obtained residue, and the solution was further heated at 85° C. for 60 minutes. This operation was repeated four times to remove THF. This way, a 10 mass % heptane dispersion liquid (binder dispersion liquid) of the binder forming the polymer was obtained.

Binder dispersion liquids used for the conditions 1, 3, 4 and 7 to 40 were prepared using the same method as that of the synthesis example, except that the amounts (mol %) of raw material compounds used for deriving the respective components shown in Table 1 were changed as shown in Table 1.

Synthesis of Diol compound for Deriving Component A (Reference Synthesis Example)

35.3 g of α-thioglycerol (manufactured by Tokyo Chemical Industry Co., Ltd.) and 50 g of 2-cyclohexen-1-one (manufactured by Tokyo Chemical Industry Co., Ltd.) were added to a 200 mL three-neck flask and were mixed. 0.50 g of triethylamine (manufactured by Fujifilm Wako Pure Chemical Corporation) was added to this solution, the solution was stirred at room temperature for 4 hours to obtain a solution. This solution was diluted with 80 g of ethyl acetate and was cleaned with 100 mL of water once and cleaned with 150 mL of saturated saline solution five times. The cleaned solution was dried with sodium sulfate, and was filtered through pleated paper to remove sodium sulfate. Next, the solvent was removed by distillation under reduced pressure. This way, a diol compound for deriving a component A-6 was obtained. The yield was 81%.

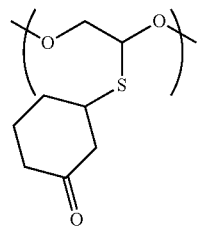

Component A-5

<Measurement of Average Particle Size of Particle Binder in Binder Dispersion Liquid>

The average particle size of the particle binder in the binder dispersion liquid was measured using the same method as the method of measuring the average particle size of the inorganic solid electrolyte. The results are shown in Table 1.

<Measurement of Mass Average Molecular Weight of Polymer>

The mass average molecular weight of the synthesized polymer was measured using the above-described method (condition 2). The results are shown in Table 1.

Regarding the binder dispersion liquids prepared as described above, the compositions of the respective polymers are shown in Table 1 below.

The components M1 to M4 shown in Table 1 are as described below.

The component M1 is the component represented by Formula (I-1) or (I-2).

The component M2 is the component represented by Formula (I-3) in which $R^{P2}$ represents an aliphatic hydrocarbon group.

The component M3 is the component represented by Formula (I-3) having the specific side chain.

The component M4 is the component represented by Formula (I-3) in which $R^{P2}$ represents the above-described molecular chain having a mass average molecular weight of 200 to 200,000.

In Table 1, "Presence Position" represents the position of the carbon atom of the carbonyl group at the side chain of the polymer. Specifically, in the molecular chain forming the side chain of the polymer, the shortest number of linking atoms from the sulfur atom of the component A-5 to the carbon atom of the carbonyl group (including the sulfur atom and the carbon atom of the carbonyl group) is shown.

<Synthesis of Sulfide-Based Inorganic Solid Electrolyte>

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide (Li$_2$S, manufactured by Aldrich-Sigma, Co. LLC. Purity: >99.98%) (2.42 g) and diphosphorus pentasulfide (P$_2$S$_5$, manufactured by Aldrich-Sigma, Co. LLC. Purity: >99%) (3.90 g) were respectively weighed, and put into a mortar. The molar ratio between Li$_2$S and P$_2$S$_5$ (Li$_2$S:P$_2$S$_5$) was set to 75:25 in terms of molar ratio. The components were mixed using an agate mortar for 5 minutes.

66 g of zirconia beads having a diameter of 5 mm were put into a 45 mL zirconia container (manufactured by Fritsch Japan Co., Ltd.), the full amount of the mixture was put thereinto, and the container was sealed in an argon atmosphere. The container was set in a planetary ball mill P-7 (trade name, manufactured by Fritsch Japan Co., Ltd.), mechanical milling was carried out at 25° C. and a rotation speed of 510 rpm for 20 hours, and a yellow powder (6.20 g) of a sulfide-based inorganic solid electrolyte (Li—P—S-based glass, LPS) was obtained.

<Preparation of Electrode Sheet for All-Solid State Secondary Battery>

An electrode sheet for an all-solid state secondary battery was prepared as follows.

(Preparation of Negative Electrode Sheet (Condition 1) (Preparation of Negative Electrode Sheet using Negative Electrode Composition under Condition 1 in Table 1 below))

(Step 1 (Mixing Method A))

180 zirconia beads having a diameter of 5 mm were put into a 45 mL zirconia container (manufactured by Fritsch Japan Co., Ltd.), and 6.6 g of LPS synthesized as described above and 12.3 g of heptane as a dispersion medium were put thereinto. The container was set in a planetary ball mill P-7 (manufactured by Fritsch Japan Co., Ltd.) and the components were mixed together for 2 hours at a temperature of 25° C. and a rotation speed of 300 rpm. Next, 7.0 g of Si powder (median size: 1 to 5 μm, manufactured by Thermo Fisher Scientific Inc., Silicon Powder) as an active material, 0.65 g of acetylene black as a conductive auxiliary agent (manufactured by Denka Co., Ltd.), and 0.3 g of the dispersion liquid of the binder shown in Table 1 expressed in terms of solid contents were charged into a container. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. As a result, a negative electrode composition was prepared.

(Step 2)

The negative electrode composition was applied to a stainless steel (SUS) foil (negative electrode current collector) having a thickness of 20 μm using an applicator (trade name: SA-201, a Baker type applicator, manufactured by Tester Sangyo Co., Ltd.) such that the weight per unit area was 2.9 mg/cm$^2$, and was heated and dried at 100° C. for 1 hour. As a result, a negative electrode sheet including the negative electrode active material layer on the negative electrode current collector was prepared. The thickness of the negative electrode active material layer was 25 μm.

(Preparation of Negative Electrode Sheet (Condition 3))

A negative electrode sheet (condition 3) was prepared using the same method as that of the preparation of the negative electrode sheet (condition 1), except that the step 1 (mixing method A) was changed to the following mixing method B.

—Mixing Method B—

180 zirconia beads having a diameter of 5 mm were put into a 45 mL zirconia container (manufactured by Fritsch Japan Co., Ltd.), and 6.6 g of the above-described synthesized LPS, 0.3 g of (expressed in terms of solid contents) of the dispersion liquid of the binder shown in Table 1, and 12.3 g of heptane as a dispersion medium were put thereinto. The container was set in a planetary ball mill P-7 (manufactured by Fritsch Japan Co., Ltd.) and the components were mixed together for 2 hours at a temperature of 25° C. and a rotation speed of 300 rpm. Next, 7.0 g of Si powder (median size: 1 to 5 μm, manufactured by Thermo Fisher Scientific Inc., Silicon Powder) as an active material, and 0.65 g of acetylene black as a conductive auxiliary agent (manufactured by Denka Co., Ltd.) were charged into a container. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. As a result, a negative electrode composition was prepared.

(Preparation of Negative Electrode Sheet (Condition 12))

A negative electrode sheet (condition 12) was prepared using the same method as that of the preparation of the negative electrode sheet (condition 1), except that the step 1 (mixing method A) was changed to the following mixing method C.

—Mixing Method C—

180 zirconia beads having a diameter of 5 mm were put into a 45 mL zirconia container S (manufactured by Fritsch Japan Co., Ltd.), and 6.6 g of LPS synthesized as described above and 12.3 g of heptane as a dispersion medium were put thereinto. The container S was set in a planetary ball mill P-7 (manufactured by Fritsch Japan Co., Ltd.) and the components were mixed together for 2 hours at a temperature of 25° C. and a rotation speed of 300 rpm. 7.0 g of Si powder (median size: 1 to 5 μm, manufactured by Thermo Fisher Scientific Inc., Silicon Powder) as an active material, 0.65 g of acetylene black as a conductive auxiliary agent (manufactured by Denka Co., Ltd.), 0.3 g of the dispersion liquid of the binder shown in Table 1 expressed in terms of solid contents, and 12.3 g of heptane were charged into a container T. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. The slurry mixed in the container T was charged into the container S. Next, using the same method, the container was set in a planetary ball mill P-7 (trade name, manufactured by Fritsch Japan Co., Ltd.) and the components were mixed together for 15 minutes at a temperature of 25° C. and a rotation speed of 200 rpm. As a result, a negative electrode composition was prepared.

(Preparation of Negative Electrode Sheets (Condition 2) and (Condition 7))

Negative electrode sheets under conditions (condition 2) and (condition 7) were prepared using the same method as that of the preparation of the negative electrode sheet under the condition 1, except that the composition of the negative electrode composition was changed as shown in Table 1 below.

(Preparation of Negative Electrode Sheets (Condition 4) to (Condition 6), (Condition 8) to (Condition 11), and (Condition 13) to (Condition 27))

Negative electrode sheets under conditions (condition 4) to (condition 6), (condition 8) to (condition 11), and (condition 13) to (condition 27) were prepared using the same method as that of the preparation of the negative electrode sheet under the condition 3, except that the composition of the negative electrode composition was changed as shown in Table 1 below.

(Preparation of Positive Electrode Sheets (Condition 28) to (Condition 33))

Positive electrode sheets under (condition 28) to (condition 33) were prepared using the same method as that of the preparation of the negative electrode sheet under the condition 3, except that a positive electrode composition having a composition shown in Table 1 below was used instead of the negative electrode composition.

(Preparation of Negative Electrode Sheets (Condition 34) to (Condition 40))

Negative electrode sheets under (condition 34) and (condition 40) were prepared using the same method as that of the preparation of the negative electrode sheet under the condition 3, except that the composition of the negative electrode composition was changed as shown in Table 1 below.

<Preparation of All-Solid State Secondary Battery>

Using the prepared negative electrode sheet, an all-solid state secondary battery was prepared as follows.

The negative electrode sheet was punched into a disk shape having a diameter of 10 mmϕ and was put into a cylinder formed of polyethylene terephthalate having a diameter of 10 mmϕ. 30 mg of LPS synthesized as described above was put into the surface of the negative electrode active material layer in the cylinder, and a SUS bar having a diameter of 10 mmϕ was inserted into the cylinder from both end openings. The negative electrode current collector side of the negative electrode sheet and LPS were pressed by the SUS bar at a pressure of 350 MPa. As a result, a solid electrolyte layer was formed. Next, the SUS bar disposed on the solid electrolyte layer side was temporarily removed, and a disk-shaped indium (In) sheet (thickness: 20 μm) having a diameter of 9 mmϕ and a disk-shaped lithium (Li) sheet (thickness: 20 μm) having a diameter of 9 mmϕ were inserted into the solid electrolyte layer in the cylinder in this order. The removed SUS bar was inserted into the cylinder again and was fixed in a state where a pressure of 50 MPa was applied. This way, an all-solid state secondary battery having a configuration of the SUS foil (thickness: 20 μm)—the negative electrode active material layer (thickness: 25 μm)—the sulfide-based inorganic solid electrolyte layer (thickness: 200 μm)—In/Li sheet (thickness: 30 μm) was obtained.

Using the prepared positive electrode sheet, an all-solid state secondary battery was prepared as follows.

The positive electrode sheet was punched into a disk shape having a diameter of 10 mmϕ and was put into a cylinder formed of PET having a diameter of 10 mmϕ. 30 mg of LPS synthesized as described above was put into the surface of the positive electrode active material layer in the cylinder, and a SUS bar having a diameter of 10 mmϕ was inserted into the cylinder from both end openings. The positive electrode current collector side of the positive electrode sheet and LPS were pressed by the SUS bar at a pressure of 350 MPa. As a result, a solid electrolyte layer was formed. Next, the SUS bar disposed on the solid electrolyte layer side was temporarily removed, and a disk-shaped indium (In) sheet (thickness: 20 μm) having a diameter of 9 mmϕ and a disk-shaped lithium (Li) sheet (thickness: 20 μm) having a diameter of 9 mmϕ were inserted into the solid electrolyte layer in the cylinder in this order. The removed SUS bar was inserted into the cylinder again and was fixed in a state where a pressure of 50 MPa was applied. This way, an all-solid state secondary battery having a configuration of the aluminum foil (thickness: 20 μm)—the positive electrode active material layer (thickness: 100 μm)—the sulfide-based inorganic solid electrolyte layer (thickness: 200 μm)—In/Li sheet (thickness: 30 μm) was obtained.

<Calculation Method>

The adsorption rate A of the binder to the active material and the adsorption rate B of the binder to the inorganic solid electrolyte were calculated as follows. In addition, a distribution rate A of the distributing component to the active material and a distribution rate B of the distributing component to the inorganic solid electrolyte were calculated as follows. In addition, the modulus of elasticity and the tensile strain at break of the polymer forming the binder were calculated as follows.

Regarding the binders other than styrene-butadiene rubber, after removing the dispersion medium and the like from the dispersion liquid, the adsorption rate, the modulus of elasticity, and the tensile strain at break were measured.

[Adsorption Rate A]

1.6 g of the active material and 0.08 g of the binder used in the electrode composition were put into a 15 mL vial, 8 g of heptane was added while stirring the solution using a mix rotor, and the solution was stirred at room temperature and 80 rpm for 30 minutes. After stirring, the dispersion liquid was filtered through a filter having a pore size of 1 μm, and 2 g of the filtrate was dried. The mass of the dried binder (the mass of the binder not adsorbed to the active material) was obtained, and the adsorption rate A was calculated from the following expression.

$$\{(0.08 \text{ g} - \text{Mass of Binder not adsorbed to Active Material} \times 8/2)0.08 \text{ g}\} \times 100(\%)$$

[Adsorption Rate B]

0.5 g of the inorganic solid electrolyte formed of the electrode composition and 0.26 g of the binder used in the electrode composition were put into a 15 mL vial, 25 g of heptane was added while stirring the solution using a mix rotor, and the solution was stirred at room temperature and 80 rpm for 30 minutes. After stirring, the dispersion liquid was filtered through a filter having a pore size of 1 μm, and 2 g of the filtrate was dried. The mass of the dried binder (the mass of the binder not adsorbed to the inorganic solid electrolyte) was obtained, and the adsorption rate B was calculated from the following expression.

$$\{(0.26 \text{ g} - \text{Mass of Binder not adsorbed to Inorganic Solid Electrolyte} \times 25/2)0.26 \text{ g}\} \times 100(\%)$$

[Distribution Rate]

Using an ion milling device (manufactured by Hitachi, Ltd., IM4000PLUS (trade name)), a cross-section of the electrode active material layer was cut out under conditions of acceleration voltage: 3 kV, discharge voltage: 1.5 V, treatment time: 4 hours, and argon gas flow rate: 0.1 ml/min. The cross-section of the electrode active material layer was observed by AES (Auger Electron Spectroscopy, manufactured by JEOL Ltd., JAMP-9510F (trade name) at a magnification of 3500-fold. The obtained image of each element was converted into a gray scale image using ImageJ, a histogram of a brightness distribution of each element was generated, and the gray scale image was binarized by using a minimum value between histogram peaks of a bimodal distribution (a peak derived from the background and a peak derived from each element) as a threshold value. As a result, a mapping cross-sectional image of each element was obtained. From the mapping cross-sectional image, a position derived from a Si atom of the active material and positions (positions of the distributing components) derived from carbon atoms of the binder and the conductive auxiliary agent were extracted to obtain the proportions of the active material present in edge portions (contours) of the distributing component. Among the lengths of all the edge portions of the distributing component, the proportion of the length in contact with the active material was obtained as the distribution rate A (%). A value obtained by subtracting the distribution rate A from 100% was set as the distribution rate B (%) of the distributing component to the inorganic solid electrolyte.

In a case where an active material other than Si was used, the measurement was performed using a peak derived from an atom of the active material other than a carbon atom. In a case where CGB (graphite) was used as the active material, a signal of a carbon atom was extracted as the position of the active material, a signal derived from an oxygen atom of the binder was extracted as the position of the distributing component, and the distribution rates were obtained using the above-described method.

[Modulus of Elasticity (Tensile Elastic Modulus)]

A specimen described in JIS K 7161 (2014) "Plastics—Determination of Tensile Properties" was obtained from the binder solution, and the tensile elastic modulus was obtained according to these standards.

Specifically, the binder was dissolved in, for example, methyl ethyl ketone (MEK) or N-methylpyrrolidone (NMP) to prepare a cast film having a thickness of about 200 µm. This cast film was cut into a size of 10 mm×20 mm and was set in a tensile tester such that the distance between chucks was 10 mm, a stress-strain curve was evaluated, and the modulus of elasticity was obtained.

[Tensile Strain at Break]

A specimen described in JIS K 7161 (2014) "Plastics—Determination of Tensile Properties" was obtained from the binder solution, and the tensile strain at break was obtained according to these standards.

Specifically, the binder was dissolved in, for example, methyl ethyl ketone (MEK) or N-methylpyrrolidone (NMP) to prepare a cast film having a thickness of about 200 µm. This cast film was cut into a size of 10 mm×20 mm and was set in a tensile tester such that the distance between chucks was 10 mm, a stress-strain curve was evaluated, and the tensile strain at break was obtained.

<Test>

The film hardness of the prepared electrode sheet for an all-solid state secondary battery and the cycle characteristics of the all-solid state secondary battery were evaluated as follows.

(Film Hardness Test)

Regarding the prepared electrode sheets (the positive electrode sheet and the negative electrode sheet), the film hardness was evaluated.

The electrode sheet was wound such that the current collector came into contact with bars having different diameters to check whether or not chipping or cracking occurred in the electrode active material layer and whether or not the electrode active material layer was peeled off from the current collector. The film hardness was evaluated based on one of the following evaluation standards to which the minimum diameter of the bar around which the electrode sheet was wound without cracking or peeling belonged. After unwinding the electrode sheet wound around the bar having the minimum diameter, whether or not chipping or cracking occurred in the electrode active material layer and whether or not peeling between the electrode active material layer and the current collector occurred was checked.

In this test, as the minimum diameter of the bar decreases, the film hardness increases, and "D" or higher is an acceptable level.

—Evaluation Standards of Film Hardness—
AA: minimum diameter<2 mm
A: 2 mm≤Minimum Diameter<4 mm
B: 4 mm≤Minimum Diameter<6 mm
C: 6 mm≤Minimum Diameter<10 mm
D: 10 mm≤Minimum Diameter<14 mm
E: 14 mm≤Minimum Diameter (Cycle Characteristics)

In an environment of 30° C., the all-solid state secondary battery prepared as described above was charged and discharged once (initialized) in a range of 4.3 V to 3.0 V under conditions of charge current value: 0.13 mA and discharge current value: 0.13 mA.

Next, as a cycle test, the all-solid state secondary battery was repeatedly charged and discharged in a range of 4.3 V to 3.0 V in an environment of 25° C. at a charge and discharge current value of 0.39 mA. This charging and discharging operation was set as one cycle.

The discharge capacity in the first cycle and the discharge capacity in the 20th cycle were measured, a discharge capacity retention ratio was measured from the following expression, and this discharge capacity retention ratio was evaluated based on the following evaluation standards to evaluate the cycle characteristics. "D" or higher is an acceptable level of this test.

Discharge Capacity Retention Ratio (%)=[Discharge Capacity in 20th Cycle]/[Discharge Capacity in First Cycle]×100

—Evaluation Standards—
AA: 85% or higher
A: 70% or higher and lower than 85%
B: 60% or higher and lower than 70%
C: 50% or higher and lower than 60%
D: 40% or higher and lower than 50%
E: 30% or higher and lower than 40%
F: lower than 30%

TABLE 1-A

| Condition | Note | Negative Electrode Active material | Inorganic Solid Electrolyte Active Content (mass %) | Inorganic Solid Electrolyte | Inorganic Solid Electrolyte Content (mass %) | Binder Component M1 | Binder Component M1 Composition (mol %) | Binder Component M2 | Binder Component M2 Composition (mol %) | Binder Presence Position | Binder Component M3 Composition (mol %) | Binder Component M3 Composition (mass %) | Binder $W^G/W^S$ | Binder Component M4 | Binder Component M4 Composition (mass %) |
|---|---|---|---|---|---|---|---|---|---|---|---|---|---|---|---|
| 1 | Comparative Example | Si | 48% | Li$_2$S–P$_2$S$_5$ | 45.5% | MDI | 50 | — | 0 | — | 0 | 0 | — | NISSO-PB GI 1000 | 50 |
| 2 | Comparative Example | Si | 48% | Li$_2$S–P$_2$S$_5$ | 45.5% | MDI | 50 | DMBA | 3 | A-5 | 3 | 0.6 | 0.62 | NISSO-PB GI 1000 | 44 |
| 3 | Example | Si | 48% | Li$_2$S–P$_2$S$_5$ | 45.5% | MDI | 50 | DMBA | 3 | A-5 | 3 | 0.6 | 0.62 | NISSO-PB GI 1000 | 44 |
| 4 | Example | Si | 48% | Li$_2$S–P$_2$S$_5$ | 45.5% | MDI | 50 | DMBA | 10 | — | 0 | 0 | — | NISSO-PB GI 1000 | 40 |
| 5 | Comparative Example | Si | 48% | Li$_2$S–P$_2$S$_5$ | 45.5% | | | | | Styrene-Butadiene Rubber | | | | | |
| 6 | Comparative Example | Si | 48% | Li$_2$S–P$_2$S$_5$ | 42.5% | | | | | Styrene-Butadiene Rubber | | | | | |
| 7 | Example | Si | 48% | Li$_2$S–P$_2$S$_5$ | 45.5% | MDI | 50 | DMBA | 10 | A-5 | 4 | 0.9 | 0.62 | NISSO-PB GI 1000 | 36 |
| 8 | Example | Si | 48% | Li$_2$S–P$_2$S$_5$ | 45.5% | MDI | 50 | DMBA | 10 | A-5 | 4 | 0.9 | 0.62 | NISSO-PB GI 1000 | 36 |
| 9 | Example | Si | 48% | Li$_2$S–P$_2$S$_5$ | 45.5% | DAB | 50 | DMBA | 10 | A-5 | 4 | 0.9 | 0.62 | NISSO-PB GI 1000 | 36 |
| 10 | Example | Si | 48% | Li$_2$S–P$_2$S$_5$ | 45.5% | DAB/AA | 25/25 | DMBA | 10 | A-5 | 4 | 0.9 | 0.62 | NISSO-PB GI 1000 ]0 | 36 |
| 11 | Example | Si | 48% | Li$_2$S–P$_2$S$_5$ | 45.5% | MDI | 50 | α-Thioglycerol | 10 | A-5 | 4 | 0.9 | 0.62 | NISSO-PB GI 1000 | 36 |
| 12 | Example | Si | 48% | Li$_2$S–P$_2$S$_5$ | 45.5% | MDI | 50 | DMBA | 10 | A-5 | 4 | 0.9 | 0.62 | NISSO-PB GI 1.000 | 36 |
| 13 | Example | Si | 48% | Li$_2$S–P$_2$S$_5$ | 45.5% | MDI | 50 | DMBA | 10 | A-5 | 10 | 2.4 | 0.62 | NISSO-PB GI 1000 | 30 |
| 14 | Comparative Example | Si | 48% | Li$_2$S–P$_2$S$_5$ | 45.5% | MDI | 50 | DMBA | 5 | A-5 | 10 | 2.4 | 0.62 | NISSO-PB GI 1000 | 35 |
| 15 | Example | CGB20 | 48% | Li$_2$S–P$_2$S$_5$ | 45.5% | MDI | 50 | DMBA | 10 | A-5 | 4 | 0.9 | 0.62 | NISSO-PB GI 1000 | 36 |
| 16 | Example | Si | 48% | Li$_2$S–P$_2$S$_5$ | 45.5% | MDI | 50 | DMBA | 10 | A-5 | 4 | 0.9 | 0.62 | NISSO-PB GI 1.000 | 36 |

TABLE 1-A-continued

| | | Negative Electrode | | | | | | | | | | | |
|---|---|---|---|---|---|---|---|---|---|---|---|---|---|
| | | Active | Inorganic | | | Binder | | | | | | | |
| | | | | Solid | Content | Component M1 | | Component M2 | | | Component M3 | | Component M4 | |
| Condition | Note | material | Content (mass %) | Electrolyte | (mass %) | | Composition (mol %) | | Composition (mol %) | Presence Position | Composition (mol %) | Composition (mass %) | $W^G/W^S$ | | Composition (mass %) |
| 17 | Example | Si | 48% | $Li_2S$—$P_2S_5$ | 46.5% | MDI | 50 | DMBA | 10 | A-5 | 4 | 4 | 0.9 | 0.62 | NISSO-PB GI 1000 | 36 |
| 18 | Example | Si | 48% | $Li_2S$—$P_2S_5$ | 42.5% | MDI | 50 | DMBA | 10 | A-5 | 4 | 4 | 0.9 | 0.62 | NISSO-PB GI 1000 | 36 |
| 19 | Example | Si | 48% | $Li_2S$—$P_2S_5$ | 35.5% | MDI | 50 | DMBA | 10 | A-5 | 4 | 4 | 0.9 | 0.62 | NISSO-PB GI 1000 | 36 |
| 20 | Example | Si | 48% | $Li_2S$—$P_2S_5$ | 45.5% | MDI | 50 | DMBA | 10 | A-5 | 4 | 4 | 0.9 | 0.62 | NISSO-PB GI 1000 | 36 |
| 21 | Example | Si | 48% | $Li_2S$—$P_2S_5$ | 45.5% | MDI | 50 | DMBA | 10 | A-5 | 4 | 4 | 0.9 | 0.62 | NISSO-PB GI 1000 | 36 |
| 22 | Example | Si | 48% | $Li_2S$—$P_2S_5$ | 45.5% | MDI | 50 | DMBA | 10 | A-5 | 4 | 4 | 0.9 | 0.62 | NISSO-PB GI 1000 | 36 |
| 23 | Example | Si | 48% | $Li_2S$—$P_2S_5$ | 45.5% | MDI | 50 | DMBA | 10 | A-5 | 4 | 4 | 0.9 | 0.62 | NISSO-PB GI 1000 | 36 |
| 24 | Example | Si | 48% | $Li_2S$—$P_2S_5$ | 45.5% | MDI | 50 | DMBA | 10 | A-5 | 4 | 4 | 0.9 | 0.62 | NISSO-PB GI 1000 | 36 |
| 25 | Example | Si | 48% | $Li_2S$—$P_2S_5$ | 45.5% | MDI | 50 | DMBA | 10 | A-5 | 4 | 4 | 0.9 | 0.62 | NISSO-PB GI 1000 | 36 |
| 26 | Example | Si | 48% | $Li_2S$—$P_2S_5$ | 45.5% | MDI | 50 | DMBA | 10 | A-5 | 4 | 4 | 0.9 | 0.62 | NISSO-PB GI 1000 | 36 |
| 27 | Example | Si | 48% | $Li_2S$—$P_2S_5$ | 50.0% | MDI | 50 | DMBA | 10 | A-5 | 4 | 4 | 0.9 | 0.62 | NISSO-PB GI 1000 | 36 |

TABLE 1-B

| Condition | Note | \(Binder\) Modulus of | Tensile | Adsorption | Adsorption | Particle Size (nm) | M.w. | Negative Electrode Content (mass %) | Conductive Auxiliary Agent | Content (mass %) | Mixing Method | Distribution Rate A (%) | Distribution Rate B (%) | Film Hardness | Cycle Characteristics |
|---|---|---|---|---|---|---|---|---|---|---|---|---|---|---|---|
| 1 | Comparative Example | 20 | 320 | 0 | 0 | 200 | 22000 | 2% | AB | 4.5% | A | 52 | 48 | E | F |
| 2 | Comparative Example | 20 | 320 | 12 | 13 | 210 | 27000 | 2% | AB | 4.5% | A | 60 | 40 | D | F |
| 3 | Example | 20 | 320 | 12 | 13 | 210 | 27000 | 2% | AB | 4.5% | B | 38 | 62 | B | D |
| 4 | Example | 20 | 320 | 0 | 51 | 200 | 22000 | 2% | AB | 4.5% | B | 14 | 86 | B | C |
| 5 | Comparative Example | 2 | 610 | 56 | 30 | — | 29000 | 2% | AB | 4.5% | B | 48 | 52 | D | E |
| 6 | Comparative Example | 2 | 610 | 56 | 30 | — | 29000 | 5% | AB | 4.5% | B | 51 | 49 | C | F |
| 7 | Example | 20 | 320 | 24 | 98 | 200 | 22000 | 2% | AB | 4.5% | A | 30 | 70 | C | B |
| 8 | Example | 20 | 320 | 24 | 98 | 200 | 22000 | 2% | AB | 4.5% | B | 16 | 84 | A | A |
| 9 | Example | 20 | 320 | 21 | 98 | 200 | 22000 | 2% | AB | 4.5% | B | 15 | 85 | A | A |
| 10 | Example | 20 | 320 | 21 | 98 | 200 | 22000 | 2% | AB | 4.5% | B | 15 | 85 | A | A |
| 11 | Example | 20 | 320 | 27 | 97 | 200 | 22000 | 2% | AB | 4.5% | B | 17 | 83 | A | A |
| 12 | Example | 20 | 320 | 24 | 98 | 200 | 22000 | 2% | AB | 4.5% | C | 39 | 61 | D | D |
| 13 | Example | 20 | 320 | 94 | 99 | 190 | 21000 | 2% | AB | 4.5% | B | 15 | 85 | A | B |
| 14 | Comparative Example | 20 | 320 | 100 | 30 | 200 | 22000 | 2% | AB | 4.5% | B | 44 | 56 | D | F |
| 15 | Example | 20 | 320 | 18 | 22 | 200 | 22000 | 2% | AB | 4.5% | B | 37 | 63 | B | C |
| 16 | Example | 20 | 320 | 22 | 96 | 200 | 22000 | 2% | AB | 4.5% | B | 19 | 81 | B | B |
| 17 | Example | 20 | 320 | 24 | 98 | 200 | 22000 | 1% | AB | 4.5% | B | 20 | 80 | D | C |
| 18 | Example | 20 | 320 | 24 | 98 | 200 | 22000 | 5% | AB | 4.5% | B | 17 | 83 | A | AA |
| 19 | Example | 20 | 320 | 24 | 98 | 200 | 22000 | 12% | AB | 4.5% | B | 15 | 85 | A | AA |
| 20 | Example | 5 | 320 | 24 | 98 | 280 | 35000 | 2% | AB | 4.5% | B | 17 | 83 | B | C |
| 21 | Example | 132 | 320 | 24 | 98 | 180 | 21000 | 2% | AB | 4.5% | B | 21 | 79 | A | A |
| 22 | Example | 290 | 320 | 24 | 98 | 150 | 19000 | 2% | AB | 4.5% | B | 19 | 81 | A | A |
| 23 | Example | 20 | 46 | 24 | 98 | 300 | 38000 | 2% | AB | 4.5% | B | 22 | 78 | A | C |
| 24 | Example | 20 | 180 | 24 | 98 | 290 | 37000 | 2% | AB | 4.5% | B | 22 | 78 | D | A |
| 25 | Example | 20 | 495 | 24 | 98 | 260 | 30000 | 2% | AB | 4.5% | B | 25 | 75 | C | A |
| 26 | Example | 270 | 380 | 24 | 98 | 230 | 29000 | 2% | AB | 4.5% | B | 26 | 74 | A | A |
| 27 | Example | 20 | 320 | 24 | 98 | 200 | 22000 | 2% | — | 0.0% | B | 21 | 79 | A | C |

TABLE 1-C

Positive Electrode

| Condition | Note | Active material | Content (mass %) | Inorganic Solid Electrolyte | Content (mass %) | Component M1 Composition | Component M1 Composition | Component M2 Composition | Component M2 Composition | Binder Presence | Component M3 Composition | Component M3 Composition | $W^G/W^S$ | Component M4 Composition | Component M4 Composition |
|---|---|---|---|---|---|---|---|---|---|---|---|---|---|---|---|
| 28 | Example | NMC | 70% | Li$_2$S—P$_2$S$_5$ | 23.5% | MDI | 50 | DMBA | 10 | 4 | A-5 | 4 | 0.9 | 0.62 | NISSO-PB GI 1000 | 36 |
| 29 | Example | NMC | 70% | Li$_2$S—P$_2$S$_5$ | 23.5% | MDI | 50 | DMBA | 5 | — | — | 0 | 0 | — | NISSO-PB GI 1000 | 45 |
| 30 | Comparative Example | NMC | 70% | Li$_2$S—P$_2$S$_5$ | 23.5% | MDI | 50 | DMBA | 5 | 4 | A-5 | 3 | 0.6 | 0.62 | NISSO-PB GI 1000 | 42 |
| 31 | Example | NMC | 70% | LLZ | 23.5% | MDI | 50 | DMBA | 10 | 4 | A-5 | 4 | 0.9 | 0.62 | NISSO-PB GI 1000 | 36 |
| 32 | Example | NMC | 70% | LLZ | 23.5% | MDI | 50 | DMBA | 5 | — | — | 0 | 0 | — | NISSO-PB GI 1000 | 45 |
| 33 | Comparative Example | NMC | 70% | LLZ | 23.5% | MDI | 50 | DMBA | 5 | 4 | A-5 | 3 | 0.6 | 0.62 | NISSO-PB GI 1000 | 42 |

Positive Electrode

| Condition | Note | (Binder) Modulus of Elasticity (MPa) | Tensile Strain at Break (%) | Adsorption Rate A (%) | Adsorption Rate B (%) | Particle Size (nm) | M.w. | Content (mass %) | Conductive Auxiliary Agent | Content (mass %) | Mixing Method | Distribution Rate A (%) | Distribution Rate B (%) | Film Hardness | Cycle Characteristics |
|---|---|---|---|---|---|---|---|---|---|---|---|---|---|---|---|
| 28 | Example | 20 | 320 | 13 | 60 | 200 | 22000 | 2% | AB | 4.5% | B | 24 | 76 | A | AA |
| 29 | Example | 20 | 320 | 24 | 52 | 210 | 27000 | 2% | AB | 4.5% | B | 35 | 65 | A | C |
| 30 | Comparative Example | 20 | 320 | 63 | 4 | 240 | 28000 | 2% | AB | 4.5% | B | 71 | 29 | D | F |
| 31 | Example | 20 | 320 | 5 | 30 | 200 | 22000 | 2% | AB | 4.5% | B | 19 | 81 | A | AA |
| 32 | Example | 20 | 320 | 25 | 40 | 210 | 27000 | 2% | AB | 4.5% | B | 40 | 60 | A | C |
| 33 | Comparative Example | 20 | 320 | 44 | 20 | 240 | 28000 | 2% | AB | 4.5% | B | 52 | 48 | D | F |

TABLE 1-D

Negative Electrode

| Condition | Note | Active material | Content (mass %) | Inorganic Solid Electrolyte | Content (mass %) | Adsorption | Adsorption | Particle Size (nm) | M.w. | Component M1 Composition | Component M2 Composition | Composition | Presence | Component M3 Composition | Composition | $W^G/W^S$ | Component M4 | Composition |
|---|---|---|---|---|---|---|---|---|---|---|---|---|---|---|---|---|---|---|
| 34 | Example | Si | 48% | Li$_2$S—P$_2$S$_5$ | 45.5% | 11 | 98 | 200 | 22000 | MDI 50 | DMBA 12 | A-5 | 4 | 2 | 0.9 | 0.62 | NISSO-PB GI 1000 | 36 |
| 35 | Example | Si | 48% | Li$_2$S—P$_2$S$_5$ | 39.5% | 11 | 98 | 200 | 22000 | MDI 50 | DMBA 12 | A-5 | 4 | 2 | 0.9 | 0.62 | NISSO-PB GI 1000 | 36 |
| 36 | Example | Si | 48% | Li$_2$S—P$_2$S$_5$ | 45.5% | 6 | 98 | 200 | 22000 | MDI 50 | DMBA 15 | A-5 | 4 | 1 | 0.9 | 0.62 | NISSO-PB GI 1000 | 34 |
| 37 | Example | Si | 48% | Li$_2$S—P$_2$S$_5$ | 45.5% | 1 | 98 | 200 | 22000 | MDI 50 | DMBA 18 | A-5 | 4 | 0 | 0.9 | 0.62 | NISSO-PB GI 1000 | 32 |
| 38 | Example | Si | 48% | Li$_2$S—P$_2$S$_5$ | 46.5% | 11 | 98 | 200 | 22000 | MDI 50 | DMBA 12 | A-5 | 4 | 2 | 0.9 | 0.62 | NISSO-PB GI 1000 | 36 |
| 39 | Example | Si | 48% | Li$_2$S—P$_2$S$_5$ | 46.5% | 6 | 98 | 200 | 22000 | MDI 50 | DMBA 15 | A-5 | 4 | 1 | 0.9 | 0.62 | NISSO-PB GI 1000 | 34 |
| 40 | Example | Si | 48% | Li$_2$S—P$_2$S$_5$ | 46.5% | 1 | 98 | 200 | 22000 | MDI 50 | DMBA 18 | A-5 | 4 | 0 | 0.9 | 0.62 | NISSO-PB GI 1000 | 32 |

Negative Electrode

| Condition | Note | (Binder) Modulus of | Tensile Strain at | Content (mass %) | Conductive Auxiliary Agent | Content (mass %) | Mixing Method | Distribution Rate A (%) | Distribution Rate B (%) | Film Hardness | Cycle Characteristics |
|---|---|---|---|---|---|---|---|---|---|---|---|
| 34 | Example | 20 | 320 | 2% | AB | 4.5% | B | 9 | 91 | A | A |
| 35 | Example | 20 | 320 | 8% | AB | 4.5% | B | 6 | 94 | AA | AA |
| 36 | Example | 20 | 320 | 2% | AB | 4.5% | B | 4 | 96 | A | AA |
| 37 | Example | 20 | 320 | 2% | AB | 4.5% | B | 0 | 100 | A | AA |
| 38 | Example | 20 | 320 | 1% | AB | 4.5% | B | 9 | 91 | C | B |
| 39 | Example | 20 | 320 | 1% | AB | 4.5% | B | 4 | 96 | B | A |
| 40 | Example | 20 | 320 | 1% | AB | 4.5% | B | 0 | 100 | B | A |

<Notes in Table>
(1) Si: Silicon Powder having a median size of 1 to 5 µm, manufactured by Thermo Fisher Scientific Inc.
(2) CGB 20: graphite having a median size of 20 µm, trade name, manufactured by Nippon Kokuen Group
(3) Sn: Sn powder having a median size of 1 to 5 µm, manufactured by Fujifilm Wako Pure Chemical Corporation
(4) NMC: $LiNi_{1/3}Co_{1/3}Mn_{1/3}O_2$ (lithium nickel manganese cobalt oxide) having a median size of 3 µm
(5) $Li_2S-P_2S_5$: LPS synthesized as described above having a median size of 1 µm
(6) LLZ: $Li_7La_3Zr_2O_{12}$ having a median size of 1.5 µm
(7) The content of each of the components of the polymer forming the binder was calculated from the raw material used for the preparation
(8) Particle size: average particle size (median size)
(9) DAB: 1,4-diaminobutane
(10) In the condition 10, 25 mol % of 1,4-diaminobutane and 25 mol % of adipic acid (AA) were used
(11) AB: acetylene black having a median size of 0.5 µm
(12) The binder and the conductive auxiliary agent were the distributing components.

As clearly seen from Table 1 (Tables 1-A to 1-D), in Comparative Examples in which the distribution rate of the distributing component to the inorganic solid electrolyte was 60% or lower, the result of at least the cycle characteristic test was unacceptable (Conditions 1, 2, 5, 6, 14, 30, and 33).

On the other hand, in the electrode sheets and the all-solid state secondary batteries in which the requirements of the present invention were satisfied, the results of the film hardness test and the cycle characteristic test were acceptable. As clearly seen from the results of the conditions 7 and 8, it was found that the film hardness and the cycle characteristics can be further improved by mixing the inorganic solid electrolyte, the active material, and the distributing component according to the specific mixing order.

The present invention has been described using the embodiments. However, unless specified otherwise, any of the details of the above description is not intended to limit the present invention and can be construed in a broad sense within a range not departing from the concept and scope of the present invention disclosed in the accompanying claims.

The present application claims priority based on JP2018-194510 filed on Oct. 15, 2018 and JP2019-021099 filed on Feb. 29, 2019, the entire contents of which are incorporated herein by reference.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: coin case
12: laminate for all-solid state secondary battery
13: cell (coin battery) for ion conductivity measurement

What is claimed is:
1. An electrode composition comprising:
an inorganic solid electrolyte;
an active material; and
a distributing component that binds to the inorganic solid electrolyte and the active material,
wherein one kind of the distributing component is a binder,
a polymer forming the binder includes a repeating unit having an amino group, a sulfanyl group, a hydroxy group, a carboxy group, or an anone group, and
a distribution rate of the distributing component to the inorganic solid electrolyte in an electrode active material layer formed of the electrode composition exceeds 60%,
wherein an adsorption rate A of the binder to the active material and an adsorption rate B of the binder to the inorganic solid electrolyte satisfy the following Expressions I) and II),

Adsorption Rate $B \geq 20\%$, and  Expression I)

Adsorption Rate $B >$ Adsorption Rate $A$.  Expression II)

2. The electrode composition according to claim 1, wherein the adsorption rate A is 25% or lower.
3. The electrode composition according to claim 1, wherein the binder is a particle binder.
4. The electrode composition according to claim 1, wherein the polymer forming the binder is a polymer having an amide bond, a urea bond, or a urethane bond.
5. The electrode composition according to claim 1, wherein the active material is a negative electrode active material having a silicon atom or a tin atom.
6. The electrode composition according to claim 5, wherein the negative electrode active material is a negative electrode active material having a silicon atom.
7. The electrode composition according to claim 1, wherein a content of the binder is higher than 2 mass % and 20 mass % or lower with respect to all solid components in the electrode composition.
8. The electrode composition according to claim 1, wherein a modulus of elasticity of a polymer forming the binder that is measured according to JIS K 7161 (2014) is 10 to 500 MPa.
9. The electrode composition according to claim 1, wherein a tensile strain at break of a polymer forming the binder that is measured according to JIS K 7161 (2014) is 50% to 700%.
10. An electrode sheet for an all-solid state secondary battery, the electrode sheet comprising:
an electrode active material layer including an inorganic solid electrolyte, an active material, and a distributing component that binds to the inorganic solid electrolyte and the active material,
wherein one kind of the distributing component is a binder,
a polymer forming the binder includes a repeating unit having an amino group, a sulfanyl group, a hydroxy group, a carboxy group, or an anone group, and
a distribution rate of the distributing component to the inorganic solid electrolyte in the electrode active material layer exceeds 60%,
wherein an adsorption rate A of the binder to the active material and an adsorption rate B of the binder to the inorganic solid electrolyte satisfy the following Expressions I) and II), Adsorption Rate $B \geq 20\%$, and  Expression I)

Adsorption Rate $B >$ Adsorption Rate $A$.  Expression II)

11. An all-solid state secondary battery comprising, in the following order:
- a positive electrode active material layer,
- a solid electrolyte layer; and
- a negative electrode active material layer in this order,
- wherein at least one of the positive electrode active material layer or the negative electrode active material layer is formed of the electrode composition according to claim 1.

12. A method of manufacturing the electrode composition according to claim 1, the method comprising:
- a step of mixing an inorganic solid electrolyte and a binder with each other to obtain a mixture; and
- a step of mixing the mixture and an active material with each other.

13. A method of manufacturing an electrode sheet for an all-solid state secondary battery, the method comprising:
- a step of applying the electrode composition obtained using the manufacturing method according to claim 12.

14. A method of manufacturing an all-solid state secondary battery, the method comprising:
- a step of manufacturing an all-solid state secondary battery using the electrode sheet for an all-solid state secondary battery obtained using the manufacturing method according to claim 13.

15. The electrode composition according to claim 1,
wherein the polymer forming the binder comprises a component having a specific side chain, the side chain in the polymer forming the binder satisfies the following conditions A and B:
Condition A: a chain structural unit spaced from an atom forming a main chain by four or more atoms has at least one group selected from the group consisting of a carbonyl group, a thiocarbonyl group, and a phosphoryl group ($>P(=O)-$); and
Condition B: any one of the carbonyl group, the thiocarbonyl group, or the phosphoryl group is not bonded to a hydroxy group.

16. An electrode sheet for an all-solid state secondary battery according to claim 10,
wherein the polymer forming the binder comprises a component having a specific side chain, the side chain in the polymer forming the binder satisfies the following conditions A and B:
Condition A: a chain structural unit spaced from an atom forming a main chain by four or more atoms has at least one group selected from the group consisting of a carbonyl group, a thiocarbonyl group, and a phosphoryl group ($>P(=O)-$); and
Condition B: any one of the carbonyl group, the thiocarbonyl group, or the phosphoryl group is not bonded to a hydroxy group.

* * * * *